(12) United States Patent
Maeda et al.

(10) Patent No.: US 7,620,811 B2
(45) Date of Patent: Nov. 17, 2009

(54) SERVER DEVICE AND PROGRAM MANAGEMENT SYSTEM

(75) Inventors: Takuji Maeda, Neyagawa (JP); Kouji Miura, Matsubara (JP); Katsumi Tokuda, Ikeda (JP); Shinji Inoue, Neyagawa (JP)

(73) Assignee: Panasonic Corporation, Osaka (JP)

( * ) Notice: Subject to any disclaimer, the term of this patent is extended or adjusted under 35 U.S.C. 154(b) by 570 days.

(21) Appl. No.: 10/511,751

(22) PCT Filed: Apr. 16, 2003

(86) PCT No.: PCT/JP03/04808

§ 371 (c)(1),
(2), (4) Date: Oct. 19, 2004

(87) PCT Pub. No.: WO03/091862

PCT Pub. Date: Nov. 6, 2003

(65) Prior Publication Data

US 2005/0251677 A1    Nov. 10, 2005

(30) Foreign Application Priority Data

Apr. 23, 2002  (JP) ............................. 2002-120430

(51) Int. Cl.
*H04L 9/00* (2006.01)

(52) U.S. Cl. .................. 713/165; 713/156; 713/155; 713/190; 713/168; 713/193; 726/15; 380/201; 380/228; 380/241; 380/202; 380/239

(58) Field of Classification Search ................ 713/165, 713/201, 155, 156, 190, 193, 168, 159, 185; 726/15; 380/201, 228, 241, 202, 239, 203, 380/255

See application file for complete search history.

(56) References Cited

U.S. PATENT DOCUMENTS 5,237,610 A * 8/1993 Gammie et al. ............. 380/228

(Continued)

FOREIGN PATENT DOCUMENTS

EP    1 083 480    3/2001

(Continued)

OTHER PUBLICATIONS

Bruce Schneier, John Wiley & Sons, Inc., "Applied Cryptography", 1996, pp. 34-41.

*Primary Examiner*—Michael J Simitoski
*Assistant Examiner*—Yonas Bayou
(74) *Attorney, Agent, or Firm*—Wenderoth, Lind & Ponack, L.L.P.

(57) ABSTRACT

A server apparatus includes a CPU, a RAM, a cipher processing unit for carrying out encryption and decryption, a communication processing unit for carrying out communication with an information processing terminal, and a data storage unit for storing information that does not require confidentiality. The server apparatus also includes a distribution information storage unit for storing information such as a program to be distributed, and a specific information distribution history holding unit for holding a specific information distribution history for managing a record of a program specific information of a program previously distributed to the information processing terminal.

11 Claims, 21 Drawing Sheets

U.S. PATENT DOCUMENTS

| | | | |
|---|---|---|---|
| 5,619,700 A * | 4/1997 | Abe | 717/122 |
| 5,751,805 A | 5/1998 | Otsuki et al. | |
| 5,754,651 A * | 5/1998 | Blatter et al. | 380/241 |
| 5,870,477 A * | 2/1999 | Sasaki et al. | 713/165 |
| 5,909,257 A * | 6/1999 | Ohishi et al. | 348/726 |
| 6,044,154 A * | 3/2000 | Kelly | 713/155 |
| 6,049,670 A * | 4/2000 | Okada et al. | 717/177 |
| 6,119,105 A | 9/2000 | Williams | |
| 6,134,659 A * | 10/2000 | Sprong et al. | 713/190 |
| 6,253,027 B1 | 6/2001 | Weber et al. | |
| 6,477,543 B1 | 11/2002 | Huang et al. | |
| 6,505,347 B1 * | 1/2003 | Kaneko et al. | 725/39 |
| 6,615,349 B1 * | 9/2003 | Hair | 713/165 |
| 6,671,724 B1 | 12/2003 | Pandya et al. | |
| 6,848,047 B1 | 1/2005 | Morikawa et al. | |
| 2001/0029526 A1 * | 10/2001 | Yokoyama et al. | 709/218 |
| 2001/0034834 A1 * | 10/2001 | Matsuyama et al. | 713/156 |
| 2003/0190044 A1 * | 10/2003 | Higashi et al. | 380/201 |
| 2004/0059911 A1 * | 3/2004 | Ueno | 713/165 |

FOREIGN PATENT DOCUMENTS

| | | |
|---|---|---|
| JP | 2-122330 | 5/1990 |
| JP | 6-87220 | 11/1994 |
| JP | 7-295800 | 11/1995 |
| JP | 07-296508 | 11/1995 |
| JP | 8-190529 | 7/1996 |
| JP | 2000-242491 | 9/2000 |
| JP | 2000-311083 | 11/2000 |
| JP | 2000-339153 | 12/2000 |
| JP | 2002-091772 | 3/2002 |
| TW | 474077 | 10/1988 |
| TW | 480859 | 7/1989 |

* cited by examiner

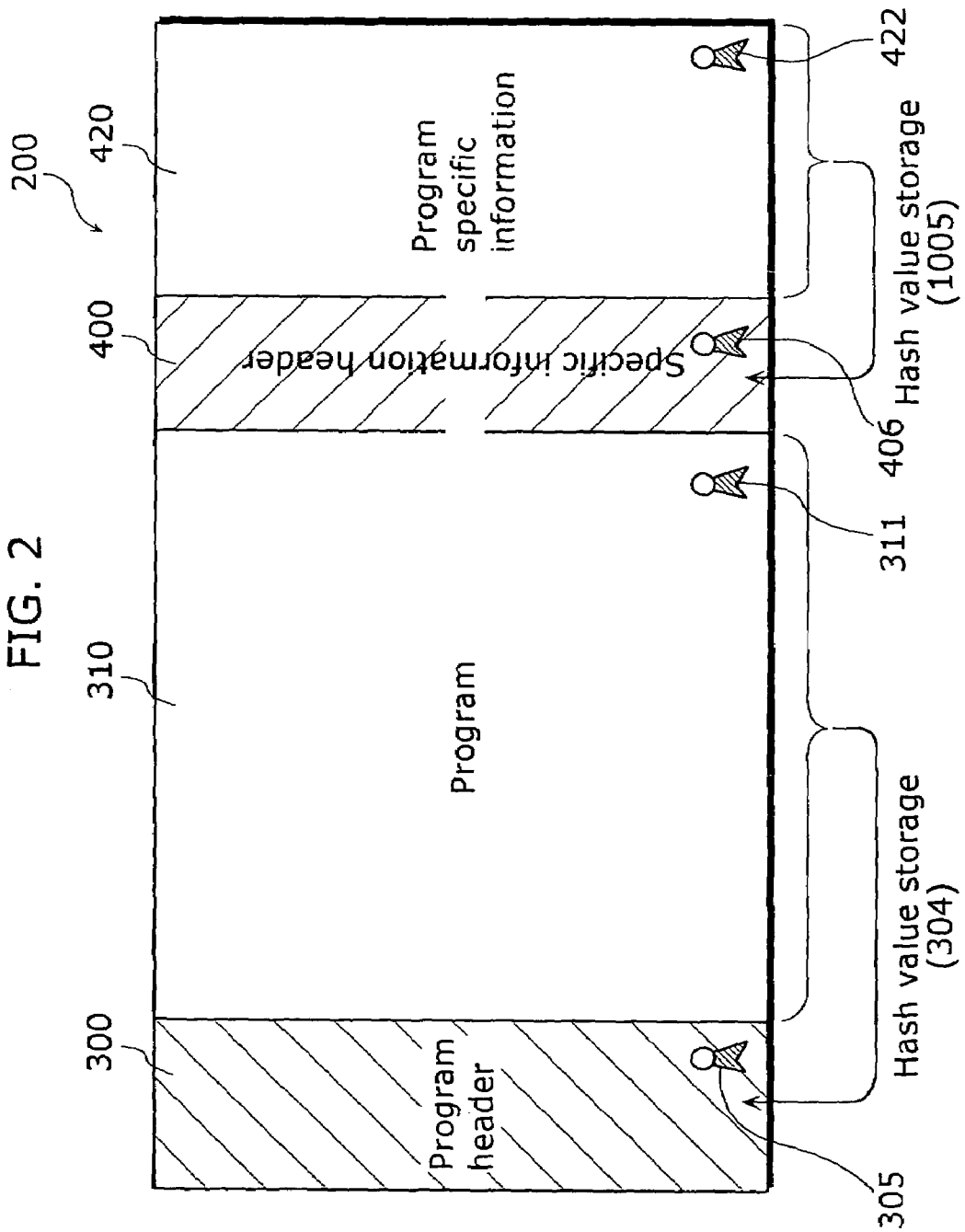

FIG. 6

Specific information distribution history 600

| Terminal ID 601 | Program specific information ID 602 | Last distribution date 603 |
|---|---|---|
| 0001 | 0001 | 2002.3.12 |
| 0002 | 0002 | 2002.3.12 |
| 0010 | 0003 | 2002.3.13 |
| 0015 | 0004 | 2002.3.14 |
| 0020 | 0005 | 2002.3.14 |

FIG. 12A

1200
Specific information distribution history

| Terminal ID | Program ID | Program specific information ID | Last distribution date |
|---|---|---|---|
| 0001 | 0001 | 0001 | 2002.3.12 |
| 0002 | 0001 | 0002 | 2002.3.12 |
| 0010 | 0001 | 0003 | 2002.3.13 |
| 0015 | 0001 | 0004 | 2002.3.14 |
| 0020 | 0002 | 1001 | 2002.3.14 |

FIG. 12B

1210
Program/specific information correspondence chart

| Program ID | Program specific information ID | Distribution start ID |
|---|---|---|
| 0001 | 0001~1000 | 0123 |
| 0002 | 1001~2000 | 1423 |
| ⋮ | ⋮ | ⋮ |

FIG. 15

Distribution number information 1500

| Terminal ID 1501 | Counter 1502 |
|---|---|
| 0001 | 1 |
| 0002 | 1 |
| 0003 | 0 |
| ⋮ | ⋮ |

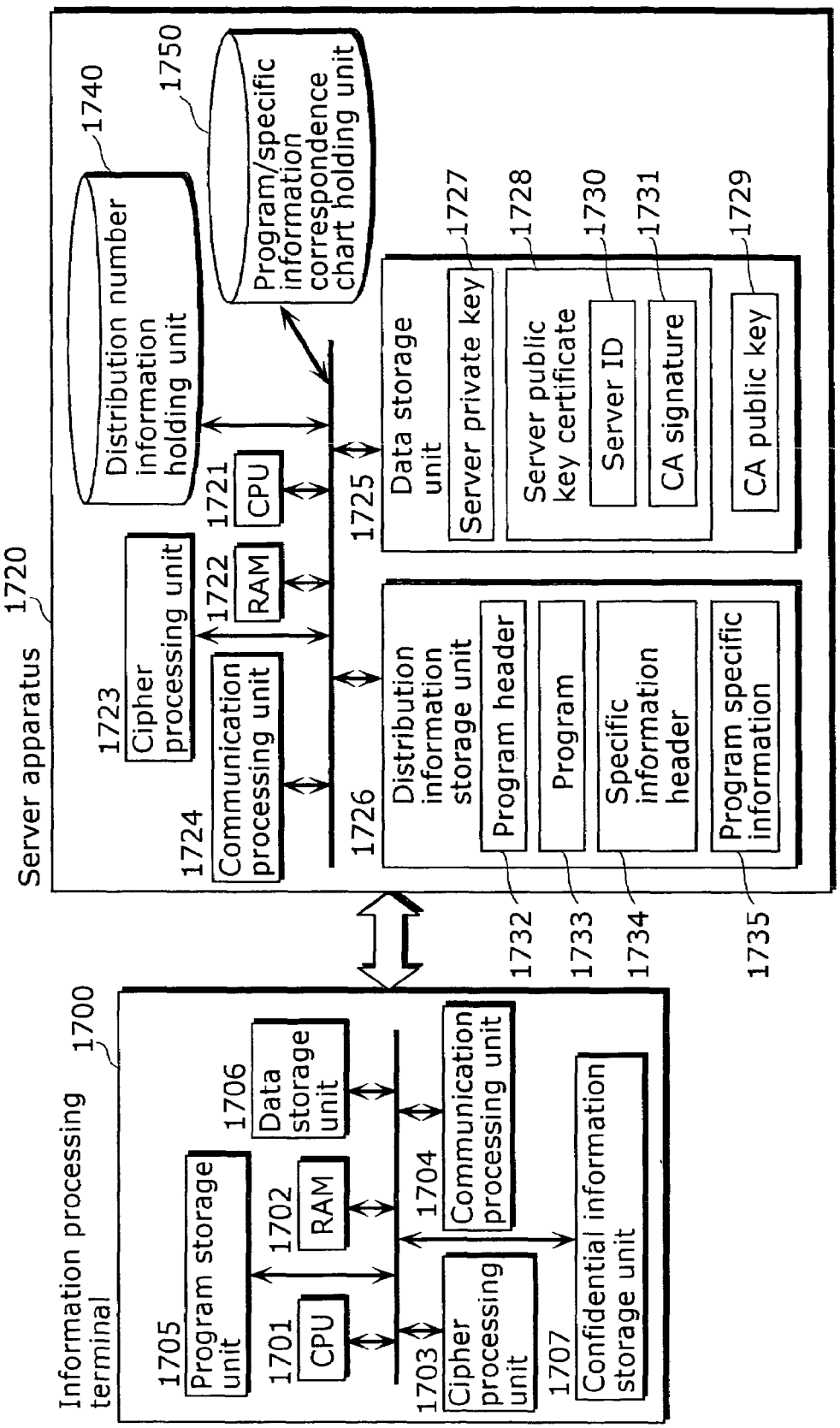

FIG. 18A

Distribution number information 1800

| Program ID 1801 | Terminal ID 1802 | Counter 1803 |
|---|---|---|
| 0001 | 0001 | 1 |
| 0001 | 0002 | 1 |
| 0001 | 0003 | 0 |
| 0002 | 0001 | 1 |
| 0002 | 0002 | 0 |
| 0002 | 0003 | 0 |
| ⋮ | ⋮ | ⋮ |

FIG. 18B

Program/specific information correspondence chart 1810

| Program ID 1811 | Program specific information ID 1812 | Distribution start ID 1813 |
|---|---|---|
| 0001 | 0001~1000 | 0123 |
| 0002 | 1001~2000 | 1423 |
| ⋮ | ⋮ | ⋮ |

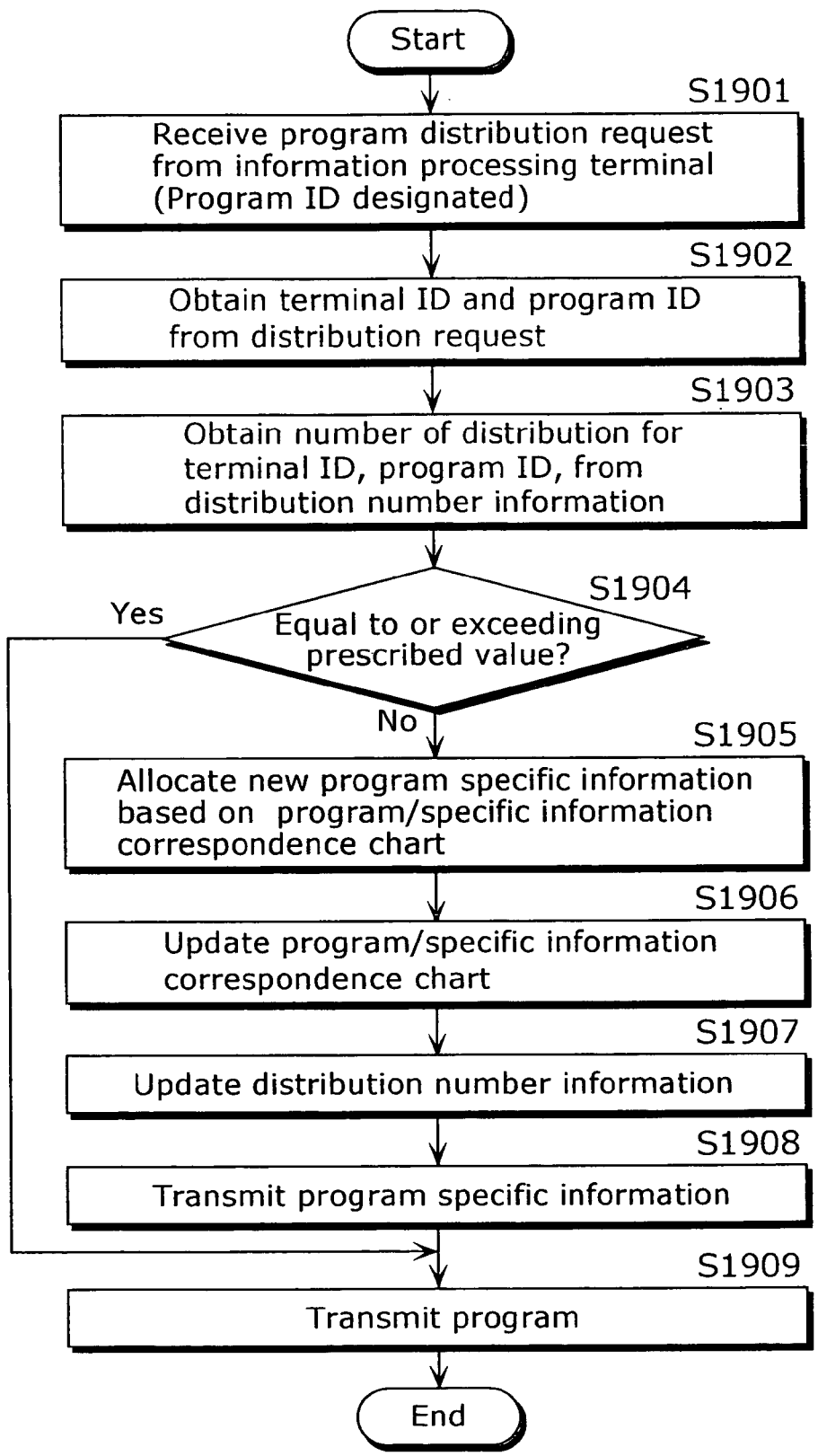

SERVER DEVICE AND PROGRAM MANAGEMENT SYSTEM

BACKGROUND OF THE INVENTION

1. Field of the Invention

The present invention relates to a server apparatus that distributes a program which runs on an information processing terminal, as well as a program management system composed of a server apparatus and an information processing terminal, and particularly to technology for the revocation of an information processing terminal attempting an unauthorized use of a program.

2. Description of the Related Art

Following the development of the network in recent years, many electronic commerce systems for conducting commerce, via the network and content distribution systems, for the distribution of contents such as movies and music, have been disclosed. In these systems, not only valuable information such as rights for the use of a content and keys used for billing, but also programs, per se, such as a music player program, can be exchanged among devices connected via the network. Furthermore, aside from the conventional PC, it is predicted that the exchange of programs in this manner shall also be implemented in built-in devices such as a mobile phone, and the like.

Now, if it is possible for a user with malicious intents to illicitly rewrite a program when a commercial system involving billing such as electronic shopping and a content distribution service is implemented via the network, there is a danger that fraudulent transactions such as the purchase of goods and contents free-of-charge through manipulation of billing information, shall be carried out. For that reason, in the case where error correction and supplementing through program updating via the network are carried out, there is a need to verify the validity of a program in order to prevent unauthorized use by a user with malicious intents.

A method that makes use of a digital signature exists as a conventional method for verifying the validity of a program (Refer to official publication of Japanese Laid-Open Patent Application No. 2000-339153, for example). In this method, an encrypted data exchange system using a set of two paired keys, referred to as public key cryptography, is utilized. FIG. 20 is an explanatory diagram for the program validity verification method that makes use of such digital signature.

A program issuer 2000 transmits a public key 2001 to a certification authority (CA) 2010 which is a third-party organization that confirms and guarantees the identity of a program issuer. Subsequently, the certification authority 2010 confirms and examines the identity of the program issuer 2000. In the case where the program issuer 2000 is judged as being authentic, the certification authority 2010 issues a public key certificate 2003, for the public key 2001 of the program issuer 2000, in which a digital signature is attached using a CA private key 2012. The public key certificate 2003 includes information for identifying the identity of a subject of a public key, and indicates that the certification authority 2010 guarantees the identity of the public key subject. The certification authority 2010 then transmits the public key certificate 2003 to the program issuer 2000.

The program issuer 2000 signs a digital signature using a private key 2002, on the program to be distributed to a user 2020, and distributes the public key certificate 2003 as well as the signed program 2004.

The user 2020 obtains a CA public key 2011 from the certification authority 2010, and verifies the signature of the public key certificate 2003 of the program issuer, using the CA public key 2011. In the case where the signature is properly verified, the public key 2001 included in the public key certificate 2003 is used to verify the signature of the signed program 2004. In the case where this signature is properly verified, it can be verified that the distributed program is a program distributed from the program issuer 2000, and that it has not been tampered with.

Accordingly, by attaching the digital signature of the program issuer 2000 to the program, the validity of the program is guaranteed, and the user 2020 can verify that an obtained program 2021 is a program that is rightfully distributed from the program issuer 2000, in this validity verification system.

However, although program validity verification is carried out at the time of distribution in the validity verification system shown in FIG. 20, it is not possible to guarantee validity for the program in an information processing terminal after distribution. Furthermore, details regarding the workings of public key cryptography as well as the certificate, signature, and certification are written in a variety of publications (Refer to "Applied Cryptography", Bruce Schneier, John Wiley & Sons, Inc. (1996), for example).

As a method for resolving this issue, there is a method where a program is distributed by being encrypted at the program distribution source using a user identifier for the program distribution destination, and a user uses the user identifier to decrypt and execute the program at the time of use (Refer to official publication of Japanese Laid-Open Patent Application No. 07-295800, for example). In this method, unauthorized copying and unauthorized manipulation can be prevented, even if by some chance a program is illicitly copied the program cannot be decrypted and executed unless the user identifier is matched.

Furthermore, a distribution apparatus that can physically prevent unlimited distribution from being carried out, and physically enforce abidance to a contract of use with regard to program copying, by judging the propriety of the distribution according to the difference between the number of program copies and the number of copy authorizations, is disclosed as a program distribution apparatus (Refer to official publication of Japanese Laid-Open Patent Application No. 06-87220, for example).

In this invention, the program distribution apparatus stores, for each program, the information processing apparatus which is the distribution destination, and distributes a program according to the number of copy authorizations and the number of copies.

On the other hand, in the case where a commercial system using the network, which involves billing, such as electronic shopping, and a content distribution service, a method for identifying a user is necessary as the billing of a user is carried out. As one of these methods, there are cases where specific information is such as an ID or a key allocated to each user, is included within a program or within information distributed together with a program. In this case, specific information is allocated to each user, and by managing the specific information at the program distribution source which is the server apparatus-side, a user can be identified based on the specific information, when the user carries out an unauthorized action.

FIG. 21 is a reference diagram of the conventional program management system used between an information processing terminal 2101 and a server apparatus 2102, as well as a server apparatus 2103. Moreover, in FIG. 21, the server apparatuses are separated into the application data server apparatus 2103 and the program server apparatus 2102, for the purpose of explanation.

The information processing terminal 2101 obtains a music player program that can download and play desired music data, from the server apparatus 2102 which is the program distribution source. It is assumed that such music player program includes specific information "0101". Moreover, in seeking safe distribution, the communication channel is encrypted using a Secure Socket Layer (SSL), preventing acts of hacking such as eavesdropping.

When the user of the information processing terminal 2101 requests for the obtainment of music data, and so on, a music data obtainment request attached with the specific information "0101" is transmitted from the information processing terminal 2101 to the application server apparatus 2103. The server apparatus 2103 possesses a revocation list (CRL: certificate revocation list) for excluding an unauthorized information processing terminal that executes the music player program. As the specific information "0101" transmitted in time with the music data obtainment request from the information processing terminal 2101 is described in the CRL, the transmission of music data to the information processing terminal 2101 is not carried out. Moreover, in the case where the specific information "0101" is not described in the CRL, the requested music data is sent to the information processing terminal 2101.

In this manner, if the specific information of the program possessed by the information processing terminal 2101 which is carrying out unauthorized program usage is identified, it is possible to revoke the information processing terminal 2101 which is attempting an unauthorized usage, by using the CRL.

Moreover, safe distribution, which protects download data from unauthorized acts by preventing download data manipulation, replacement and eavesdropping, is made possible by the attachment of a digital signature to data to be downloaded from the server apparatus 2102 to the information processing terminal 2101 and the performance of signature verification at the information processing terminal 2101-side.

However, the problem of having an increased processing load on the program distribution source arises in the method described above, where program encryption in compliance with individual user identifiers is carried out at the program distribution source.

Furthermore, the aforementioned method in which a program distribution apparatus stores, for each program, the information processing apparatus which is the distribution destination, and distributes a program according to the number of copy authorizations and the number of copies, is a method in which a program distribution apparatus confirms the ID of the apparatus which is the distribution destination and distributes a program according to the number of copy authorizations, for every distribution request. It is not a method that prevents the unauthorized use of a program.

In addition, in the method shown in FIG. 21 where the server apparatus 2103 uses a CRL in which specific information of programs is described, to perform the revocation of the information processing terminal 2101 attempting an unauthorized usage, even in the case where data obtainment is revoked as being from an unauthorized terminal according to the CRL of the server apparatus 2103 when the information processing terminal 2101 attempts to obtain data illicitly, a problem exists in which the revocation using the CRL of the server apparatus 2103 can be circumvented. This circumvention is carried out through the downloading of different specific information from the server apparatus 2102 by the user of the information processing terminal 2101 and updating the specific information of the program with the new specific information.

The present invention is conceived in view of issues such as those mentioned above and has as a first objective to provide a server that prevents an unauthorized information processing terminal that has been revoked according to a list using specific information in a server apparatus which is the program distribution source, from avoiding such revocation by obtaining new specific information. Furthermore, the present invention also has the objective of reducing the process load for a server apparatus, with regard to program distribution to an information processing terminal.

Furthermore, the present invention has as another objective to provide a program management system that can prevent unauthorized usage of a program by an information processing terminal by revoking an obtainment request for new specific information from an unauthorized information processing terminal, in the program managing system where program distribution is carried out between a server apparatus and an information processing terminal.

BRIEF SUMMARY OF THE INVENTION

In order to resolve the aforementioned issues, the server apparatus in the present invention is a server apparatus, connected, via a network, to an information processing terminal holding a terminal ID that cannot be re-written externally, that holds a program running on the information processing terminal, the server apparatus comprising a table holding unit operable to hold a table indicating a relation between a previously distributed program and a terminal ID, and a decision unit operable to decide, by referring to the table, whether or not to distribute a program in response to a program obtainment request attached with the terminal ID, transmitted from the information processing terminal.

Furthermore, the program distributed, to the information processing terminal, from the server apparatus in the present invention includes a program body running on the information processing terminal and program specific information for running the program body, and the decision unit decides (i) to distribute only the program body to the information processing terminal by prohibiting distribution of the program specific information in the case where the terminal ID attached to the program obtainment request is recorded in the table, and (ii) to add the terminal ID and the program specific information, to the table, in a correspondence relation with each other, and distribute the program body and the program specific information to the information processing terminal in the case where said terminal ID is not recorded in the table.

Accordingly, the server apparatus can prevent the information processing terminal from obtaining new program specific information corresponding to a previously distributed program and the unauthorized acts of an information processing terminal attempting to avoid revocation by obtaining new program specific information can be prevented.

Moreover, in order to resolve the aforementioned issues, the program management system in the present invention is a program management system comprising an information processing terminal is holding a terminal ID that cannot be re-written externally, and a server apparatus, connected, via a network, to the information processing terminal, that holds a program running on the information processing terminal. The information processing terminal transmits, to the server apparatus, a program obtainment request attached with the terminal ID when requesting for obtainment of a program, and the server apparatus includes a table holding unit operable to hold a table indicating a relation between a previously distributed program and a terminal ID, after receiving the program obtainment request, and a decision unit operable to decide, by referring to the table, whether or not to distribute a program in response to a program obtainment request attached with the terminal ID, transmitted from the information processing terminal.

In this manner, the present invention can be implemented, not only as the server apparatus mentioned above, but also as a program management system used between the server apparatus and the information processing terminal, or a program distribution method which uses the units included in the server apparatus, as steps. Furthermore, it goes without saying that the present invention can be implemented as a program for implementing such a program distribution method on a computer, or the like, and that such program can be brought into circulation, via a recording medium such as a CD-ROM, or via a transmission medium such as a communication network.

BRIEF DESCRIPTION OF THE DRAWINGS

FIG. 2 is a configuration diagram of the program entirety which is transmitted from the server apparatus in the first embodiment to the information processing terminal-side.

FIG. 6 is a diagram showing an example of the information storage in the specific information distribution history held by the specific information distribution history holding unit.

FIG. 12A is a diagram showing an example of information included in the specific information distribution history in the second embodiment.

FIG. 12B is a diagram showing an example of information included in the program/specific information correspondence chart in the second embodiment.

FIG. 15 is a chart showing an example of the information storage of the distribution number information in the third embodiment.

FIG. 17 is a configuration diagram of the information processing terminal and the server apparatus, in the fourth embodiment.

FIG. 18A is a diagram showing an example of data stored in the distribution number information in the fourth embodiment.

FIG. 18B is a diagram showing an example of data stored in the program/specific information correspondence chart in the fourth embodiment.

FIG. 19 is a flowchart showing the program distribution procedure in the server apparatus.

DETAILED DESCRIPTION OF THE INVENTION

Hereinafter, the server apparatus as well as the program management system according to the embodiments of the present invention shall be explained using the diagrams.

First Embodiment

Figure 1:
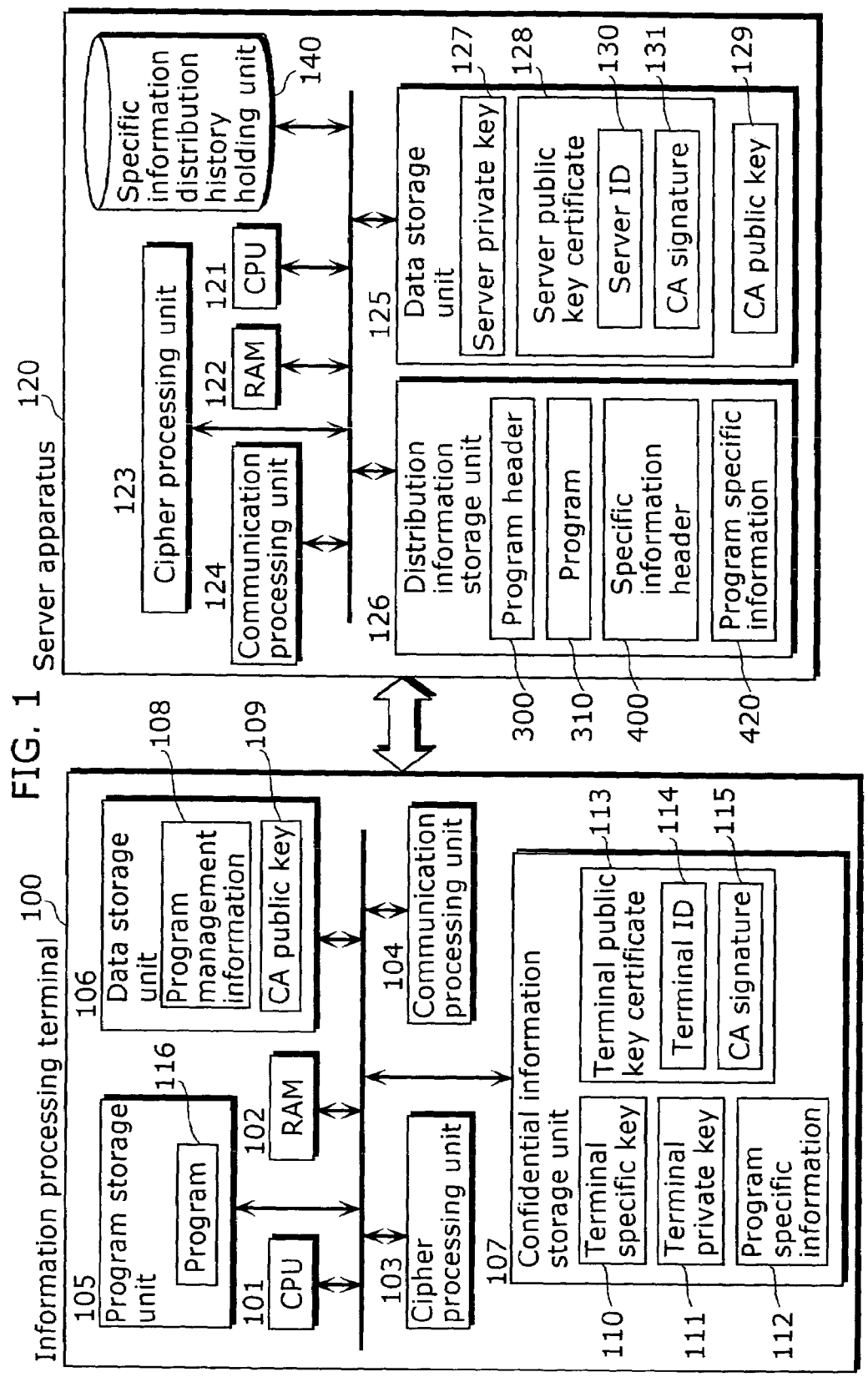
FIG. 1 is a configuration diagram of the information processing terminal and the server apparatus in the first embodiment.

FIG. 1 shows a configuration diagram of an information processing terminal 100 and a server apparatus 120 in the first embodiment of the present invention.

The information processing terminal 100 is a terminal apparatus that uses a program used in electronic commerce, content distribution, or the like, obtained from the server apparatus 120. It is made up of a CPU 101, a RAM 102, a cipher processing unit 103 for carrying out the encryption and decryption of a program, data, or the like, a communication processing unit 104 for carrying out communication with the server 120, a program storage unit 105 for storing a program, a data storage unit 106 for storing information that does not particularly require confidentiality such as a CA public key, and a confidential information storage unit 107 for storing information that requires confidentiality, such as a private key.

The program storage unit 105 stores a program 116 that runs on the CPU 101.

The data storage unit 106 stores, from among the data used by the information processing terminal 100, data which does not particularly require confidentiality. Alongside this, it stores a CA public key 109 as well as program management information 108 which is management information of a stored program such as a program ID and a version number, stored in the information processing terminal 100.

Furthermore, the confidential information storage unit 107 stores information that requires confidentiality within the information processing terminal 100. It stores a terminal specific key 110 which is a key that is different for each information processing terminal, a terminal private key 111 which is one of a pair of public keys which are different for each information processing terminal, program specific information 112 which is a specific key used by a program, and a terminal public key certificate 113 which is the other of the pair of public keys which are different for each information processing terminal. Furthermore, the terminal public key certificate 113 includes a terminal ID 114 which is an ID that uniquely identifies the information processing terminal 100, and a CA signature 115 which is attached to the terminal public key certificate 113 by the certification authority.

On the other hand, the server apparatus 120 in the present invention is an apparatus for distributing a program requested by the information processing terminal 100. It is made up of a CPU 121, a RAM 122, a cipher processing unit 123 for carrying out the encryption and decryption of a program, data, or the like, a communication processing unit 124 for carrying out communication with the information processing terminal 100, a data storage unit 125 for storing information that does not particularly require confidentiality such as a CA public key, a distribution information storage unit 126 for storing information such as a program to be distributed to the information processing terminal 100, and a specific information distribution history holding unit 140.

Further, the server apparatus 120 in the present invention is characterized by the possession of the specific information distribution history holding unit 140. This specific information distribution history holding unit 140 holds a specific information distribution history 600 for the purpose of managing the history of the program specific information of a program that has been distributed to the information processing terminal 100.

The data storage unit 125 is a region for storing information used by the server apparatus 120. It stores a server private key 127 which is one of a pair of public keys, a server public key certificate 128 which is the other of the pair of public keys, and a CA public key 129. The server public key certificate 128 includes a server ID 130 which is an ID that uniquely identifies the server, and a CA signature 131 which is attached to the server public key certificate by the CA. The distribution information storage unit 126 is a region for storing information distributed by the server apparatus 120 to the information processing terminal 100. It stores a program header 300, a program 310, a specific information header 400, and program specific information 420. Furthermore, a diagram for the program in its entirety, which is the distribution information, is shown in FIG. 2 to be described later.

A signature of the CA, which is a third-party certification organization, is attached to the program header 300, the program 310, the specific information header 400, and the program specific information 420, stored in the distribution information storage unit 126. Through this CA signature, distribution information is guaranteed as being information distributed from a valid distribution source.

FIG. 2 is a configuration diagram of the program entirety 200 which is transmitted from the server apparatus 120 in the present embodiment to the information processing terminal 100. This program entirety 200 is information stored in the distribution information storage unit 126 of the server apparatus 120. In the present embodiment, it is structured from the program header 300, the program 310, the specific information header 400, and the program specific information 420. Furthermore, in the present invention, the program entirety 200 is characterized by being separated into the program 310 and the program specific information 420, and in addition, by being separated into a header segment and a data segment.

Moreover, in the program management system in the present embodiment, in the case where the information processing terminal 100 obtains application data to be used in the program 310, from the sever apparatus 120 or the like, the application data obtainment request is attached with the program specific information 420 and transmitted. As a result, it becomes possible to reject an unauthorized information processing terminal through the CRL using the program specific information 420, carried by the server apparatus 120, and the like.

Figure 3B:
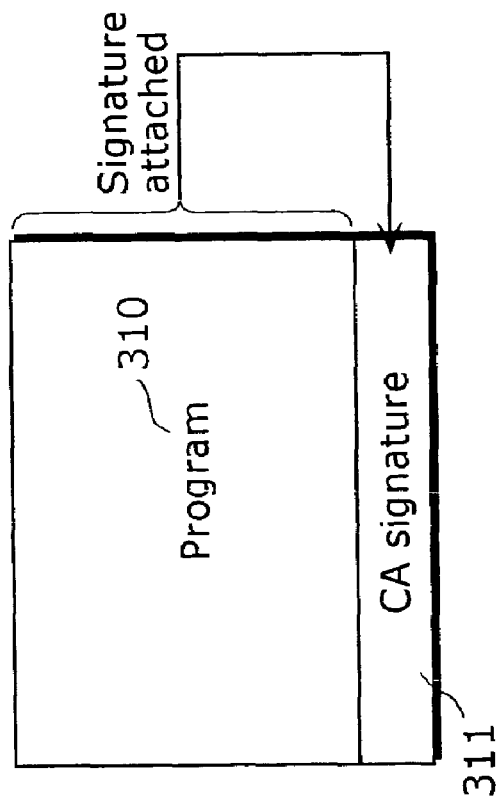
FIG. 3B is a diagram showing an example of information stored in a program.
Figure 3A:
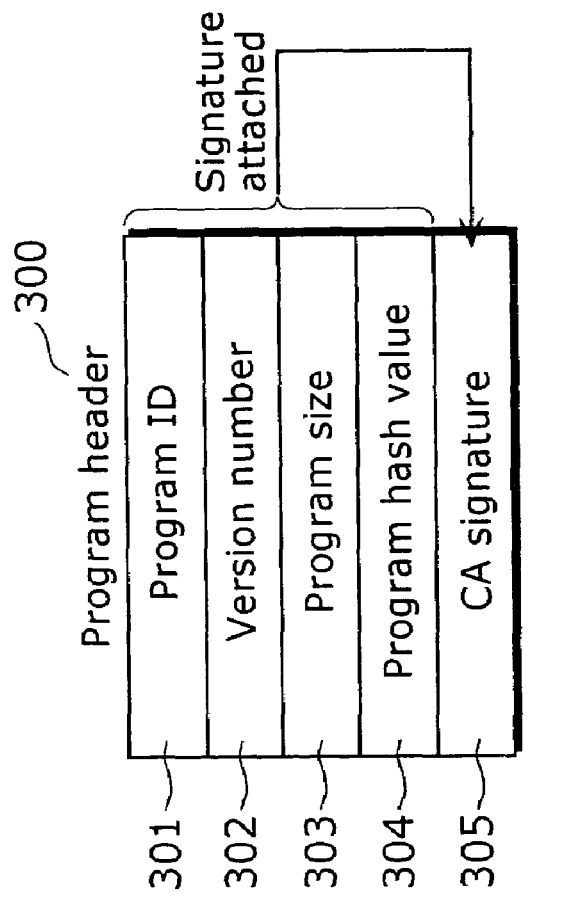
FIG. 3A is a diagram showing an example of information stored in a program header.

FIG. 3A and FIG. 3B are diagrams showing an example of information stored in the program header 300 and the program 310.

The program header 300 stores information regarding the program 310, and includes the following information:

(1) a program ID (301) indicating the program 310 to which the information stored by the program header 300 corresponds;

(2) a version number (302) of the corresponding program 310;

(3) a program size (303) of the corresponding program 310;

(4) a program hash value (304) of the corresponding program 310; and (5) a CA signature (305) for the program header 300 as a whole, which includes the information from (1) to (4) mentioned previously.

In addition, a CA signature (311) which corresponds to the program 310 is attached to the program 310. In this manner, it is possible to verify, in the information processing terminal 100, that a program header and program are distributed from a valid distribution source, as both of the program header 300 and the program 310 include the CA signatures 305 and 311 respectively.

Figure 4A:
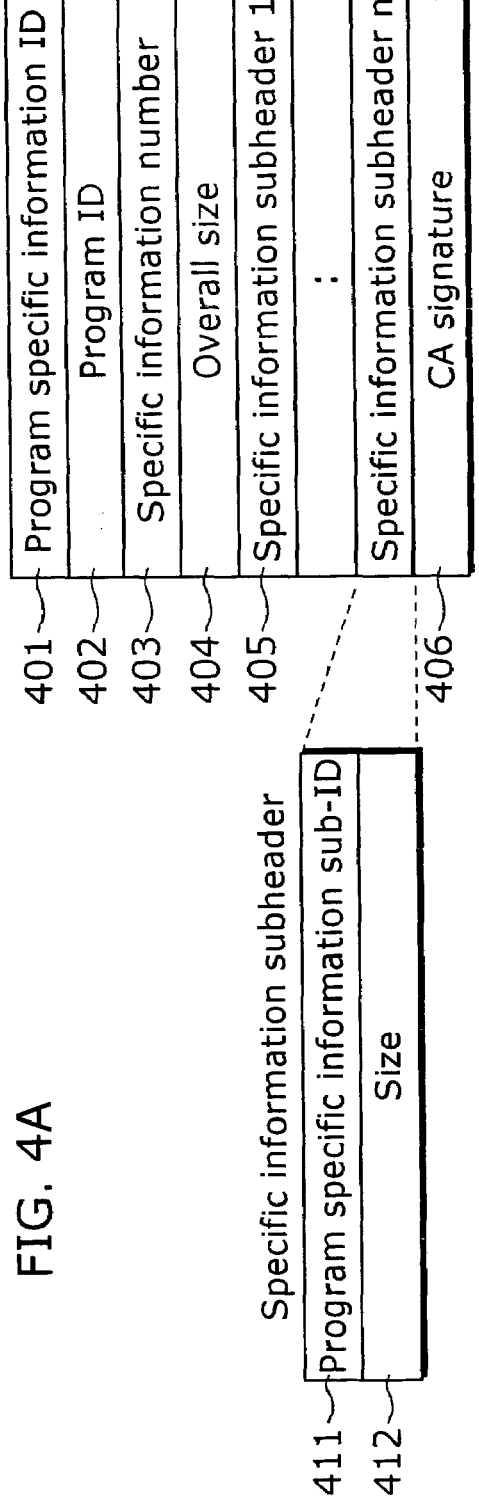
FIG. 4A is a diagram showing an example of information stored in the specific information header.
Figure 4B:
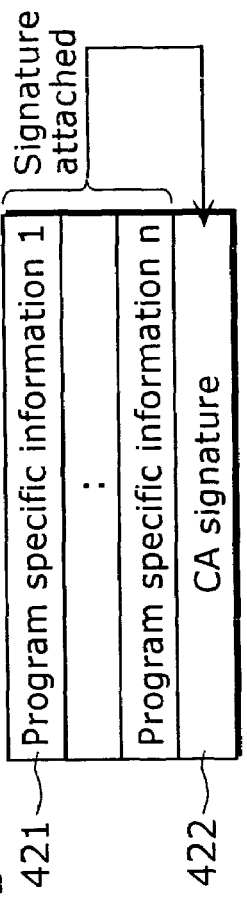
FIG. 4B is a diagram showing an example of information stored in the program specific information.

FIG. 4A and FIG. 4B are diagrams showing an example of information stored in the specific information header 400 and the program specific information 420.

The specific information header 400 stores information regarding the program specific information 420, and includes the following information:

(1) a program specific information ID (401) indicating the program specific information 420 to which the information stored by the program header 300 corresponds;

(2) a program ID (402) of the program 310 using the corresponding program specific information 420;

(3) a specific information number (403) which is the number of specific information stored by the corresponding program specific information 420;

(4) an overall size (404) of the corresponding program specific information 420;

(5) a specific information subheader (405) indicating information regarding individual specific information included in the corresponding program specific information 420. The specific information subheader 405 only stores the number (1 to n) of individual specific information included in the program specific information 420; and (6) a CA signature (406) for the specific information header 400 as a whole, which includes the information from (1) to (5) mentioned previously.

In addition, the specific information subheader 405 is structured from a program specific information sub-ID 411 which is an ID for identifying individual specific information, and a size 412 of individual specific information.

Furthermore, the program specific information 420 includes a plurality of program specific information (421), and a CA signature (422) for the entire program specific information. As such, it is possible to verify, in the information processing terminal 100, that the specific information header 400 and the program specific information header 420 are distributed from a valid distribution source, as the specific information header 400 and the program specific information header 420 both include CA signatures (406 and 422 respectively).

Figure 5:
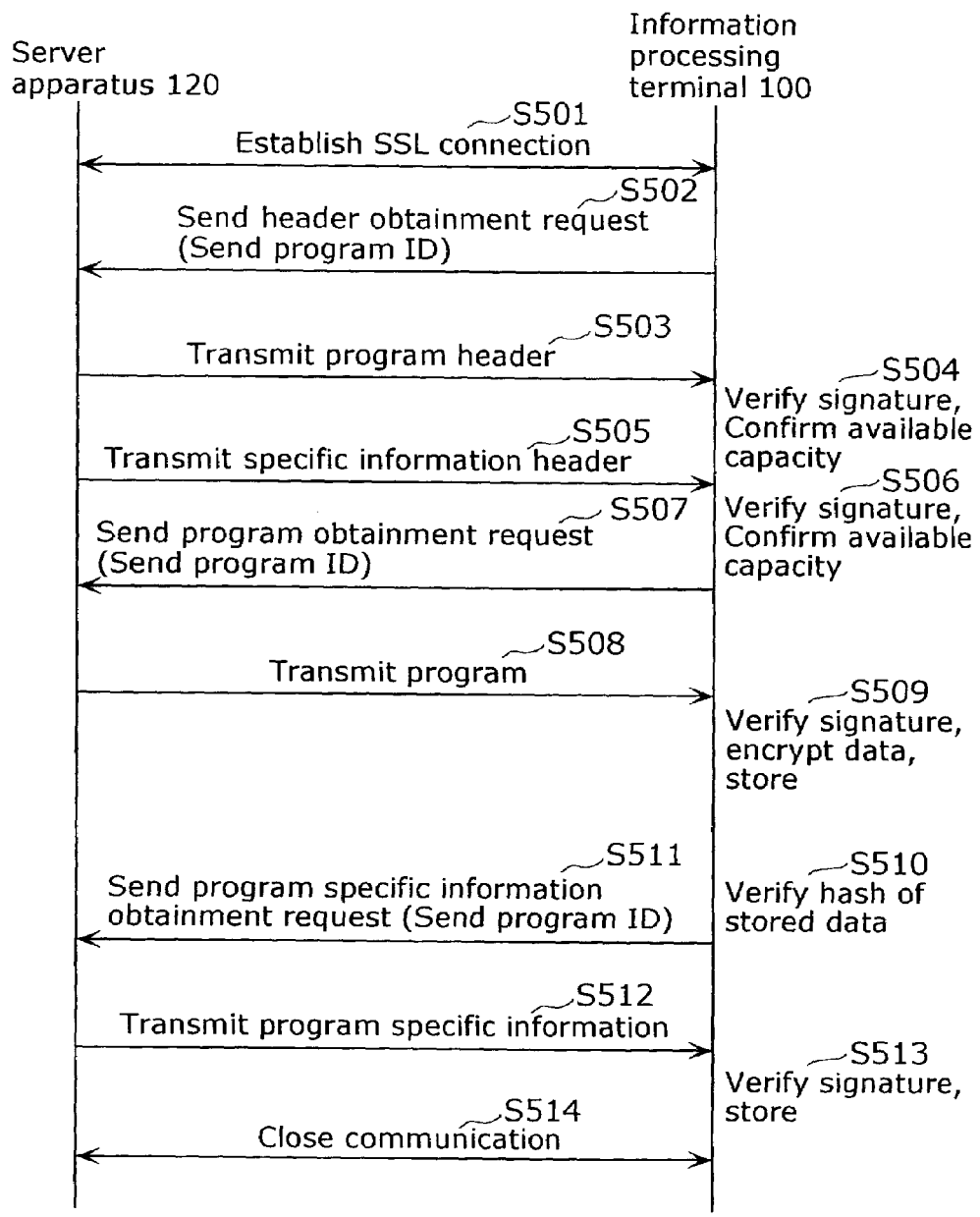
FIG. 5 is a diagram showing the operational procedures in the program updating sequence between the information processing terminal and the server apparatus.

Next, an example of the operating procedure in the program updating system carried out between the information processing terminal 100 and the server apparatus 120 shall be explained with the use of FIG. 5. In this program updating system, the information processing terminal 100 first carries out a header obtainment request, and a confirmation of the available area is carried out. Furthermore, the information processing terminal 100 attempting an unauthorized use of a program can be revoked in the server apparatus 120 by referring to the specific information distribution history 600 from the specific information distribution history holding unit 140.

First, the information processing terminal 100 establishes a connection with the server apparatus 120 through an SSL (S501). At this time, the server apparatus 120 carries out the obtainment of the terminal ID of the information processing terminal 100. It should be noted that the SSL is a mechanism in which data is transmitted and received by being encrypted using both public key cryptography and private key cryptography, in order to transmit and receive data safely between two points. Furthermore, as a key referred to as a session key, which is valid only for that session, is shared in the SSL, the transmission and reception of data between the information processing terminal 100 and the server apparatus 120 from S502 onward shown in FIG. 5 are all carried out through encrypted data using session keys.

Next, the information processing terminal 100 carries out a header obtainment request by designating the program ID of the program 310 to be obtained, to the server apparatus 120 (S502). At this time, the server apparatus 120 confirms the correspondence relation of the terminal ID and the program specific information ID according to the specific information distribution history 600 being held in the specific information distribution history holding unit 140. In other words, confirmation is made as to whether or not the specific information ID has already been distributed to the information processing terminal 100. Then, in the case where it is judged that it is a header obtainment request from an authorized information processing terminal, the server apparatus 120, having received the header obtainment request, transmits the program header 300 stored in the distribution information storage unit 126 to the information processing terminal 100 (S503).

Having received the program header 300 from the server apparatus 120, the information processing terminal 100 verifies the CA signature included in the program header 300 using the CA public key 109 stored in the data storage unit 106 (S504). With this, the information processing terminal 100 verifies that the program header 300 is unmanipulated information distributed from a valid distribution source. Furthermore, as information regarding the program such as the program's program ID 301, version number 302, size 303, and the program hash value 304, are stored in the program header 300, the information processing terminal 100 compares such information with the program ID, version information, and available capacity information described within the program management information 108 stored in the data storage unit 106, and confirms whether the update subject program 310 was correctly distributed from the server apparatus 120, and whether available capacity for storing the program 310 exists (S504). As such, the information processing terminal 100 in the present embodiment prevents drawbacks that can lead to program obtainment disapproval during the downloading of the program 310.

Next, the server apparatus 120 transmits the specific information header 400 stored in the distribution information storage unit 126 to the information processing terminal 100 (S505).

Then, having received the specific information header 400 from the server apparatus 120, the information processing terminal 100 verifies the CA signature included in the specific information header 400 using the CA public key 109 stored in the data storage unit 106 (S506). With this, the information processing terminal 100 verifies that the specific information header 400 is unmanipulated information distributed from a valid distribution source. Information regarding the program specific information 420, such as the program specific ID 401 for uniquely identifying the program specific information 420, the program ID 402 of a program associated with the program specific information 420, the specific information number 403 which is the number of specific information included in the information distributed through the program specific information 420, and the size 404, is stored in the specific information header 400. As such, the information processing terminal 100 compares such information with the program ID, and available capacity information described within the program management information 108 stored in the data storage unit 106, and confirms whether the program specific information 420 regarding the program 310 to be updated is correctly distributed from the server apparatus 120, and whether available capacity for storing the program specific information 420 exists, before downloading of the program 310 (S506).

Then, in the case where it is judged that the obtainment of the program 310 and the program specific information 420 can be carried out, the information processing terminal 100 carries out a program obtainment request to the server apparatus 120 by designation a program ID (S507).

Having received the program obtainment request, the server apparatus 120 transmits the program 310 stored in the distribution information storage unit 126 to the information processing terminal 100 (S508). Having the received the program 310 from the server apparatus 120, the information processing terminal 100 verifies the CA signature included in the program 310 using the CA public key 109 stored in the data storage unit 106 (S509). With this, the information processing terminal 100 verifies that the program 310 is unmanipulated information distributed from a valid distribution source. In the case where the validity of the obtained data is verified, the obtained program 310 is encrypted with the terminal specific key 110 stored in the confidential information storage unit 107, and stored in the program storage unit 105 (S509). At that time, program management is carried out by storing the program storage position, program ID, version number, and so on, in the program management information 108.

Next, after the storage of the program is finished, the program 116 stored in the program storage unit 105 is decrypted using the terminal specific key 110, and the hash value is calculated. A comparison is carried out between the calculated hash value and the hash value stored in the program header 300, and the correct storage of the program is confirmed (S510).

Next, the information processing terminal 100 carries out a program specific information obtainment request by designating the program ID to the server apparatus 120 (S511).

Subsequently, the server apparatus 120 transmits the program specific information 420 stored in the distribution information storage unit 126 to the information processing terminal 100 (S512). Having received the program specific information 420 from the server apparatus 120, the information processing terminal 100 verifies the CA signature included in the program specific information 420 using the CA public key 109 stored in the data storage unit 106 (S513). With this, the information processing terminal 100 verifies that the program specific information 420 is unmanipulated information distributed from a valid distribution source. In the case where the validity of the obtained data is verified, the obtained program specific information 420 is stored in the confidential information storage unit 107 (S513).

Finally, after the storage of the program and program specific information by the information processing terminal 100 is finished, is the communication between the information processing terminal 100 and the server apparatus 120 is closed (S514).

In this manner, the information processing terminal 100 in the present embodiment can carry out safer downloading of a program by confirming whether available capacity for storing the program 310 exists, and so on, through the performance of the header obtainment request. Moreover, in this case, by calculating the hash values of the program 310 as well as the program specific information 420, and comparing the calculated hash values with the hash values stored in the program header 300 as well as the program specific information header 400, confirmation of valid distribution information can also be cited.

FIG. 6 is a diagram showing an example of the information storage of the specific information distribution history 600 held in the specific information distribution history holding unit 140.

It is assumed that the specific information distribution history 600 is the table in which the server apparatus 120 records the program specific information 420 corresponding to the program previously distributed to the information processing terminal 100, and the terminal ID of such information processing terminal 100.

Further, the server apparatus 120 stores, in the specific information distribution history holding unit 140, a terminal ID 601 which is an ID for identifying the information processing terminal 100 to which the program specific information 420 was distributed, and a program specific information ID 602 which is an ID for identifying the distributed program specific information 420. Furthermore, a last distribution date 603 indicating the last distribution date of the program specific information 420 is stored in the specific information distribution history 600, as needed.

In FIG. 6 the server apparatus 120 has distributed five items of program specific information 420 to the information processing terminal 100. The respective terminal IDs 601 and program specific information IDs 602 are, (terminal ID, program specific information ID)=(0001, 0001), (0002, 0002), (0010, 0003), (0015, 0004), and (0020, 0005).

Figure 7:
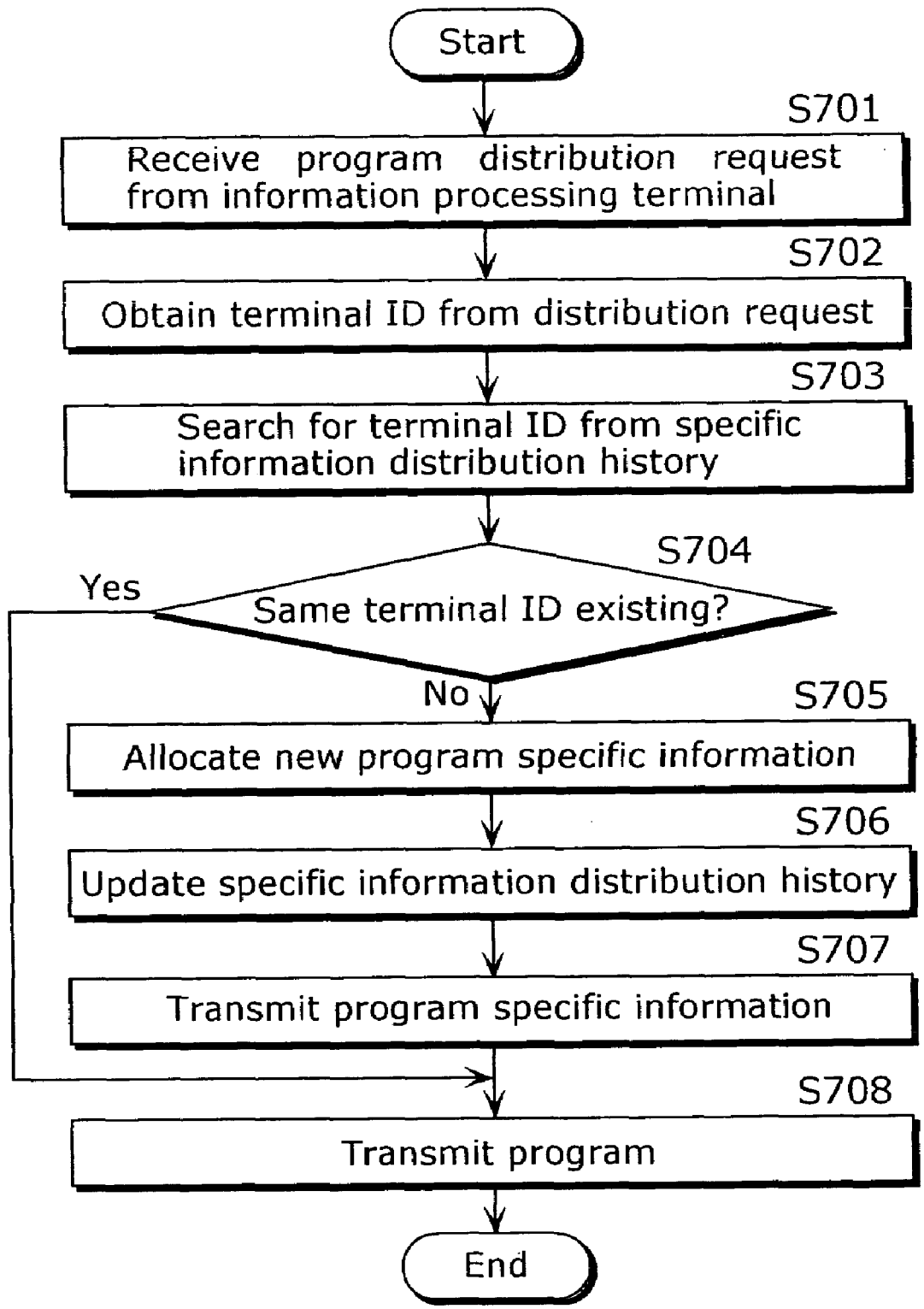
FIG. 7 is a flowchart showing the distribution procedure for a program, in the server apparatus.

FIG. 7 is a flowchart showing the distribution procedure for the program 310, in the server apparatus 120.

First, the server apparatus 120 receives a program distribution request from the information processing terminal 100 (S701). Next, the server apparatus 120 obtains the terminal ID of the information processing terminal 100 included in the program distribution request received (S702), and searches for the obtained terminal ID in the specific information distribution history 600 (S703). A judgment is then carried out as to whether or not the same terminal ID is stored in the specific information distribution history 600 (S704).

In the case where the same terminal ID is stored in the specific information distribution history 600 (Yes, in S704), the server apparatus 120 transmits only the program 310 and concludes the process (S708), as the program specific information 420 has already been distributed to the information processing terminal 100.

Furthermore, in the case where the same terminal ID is not stored in the specific information distribution history 600 (No, in S704), the server apparatus 120 allocates a new program specific information 420 to the information processing terminal 100 (S705). The specific information distribution history 600 is then updated by adding the correspondence of the terminal ID 601 and the program specific information ID 602 with regard to the newly allocated program specific information 420 (S706). Subsequently, the server apparatus 120 transmits the program specific information 420 to the information processing terminal 100 (S707), and transmits the program 310 to the information processing terminal 100 (S708), then concludes the process.

In this manner, the distribution of a plurality of program specific information 420 to a single information processing terminal 100 is reliably prevented through distribution management of program specific information using the specific information distribution history 600 in the server apparatus 120. With this, the server apparatus 120 does not allocate new program specific information 420 to an information processing terminal 100 which has already been recognized as an unauthorized terminal and revoked, using the program specific information 420 according to the CRL, or the like. Accordingly, unauthorized action of the information processing terminal 100 attempting to avoid revocation by obtaining new program specific information 420 can be prevented.

Figure 8:
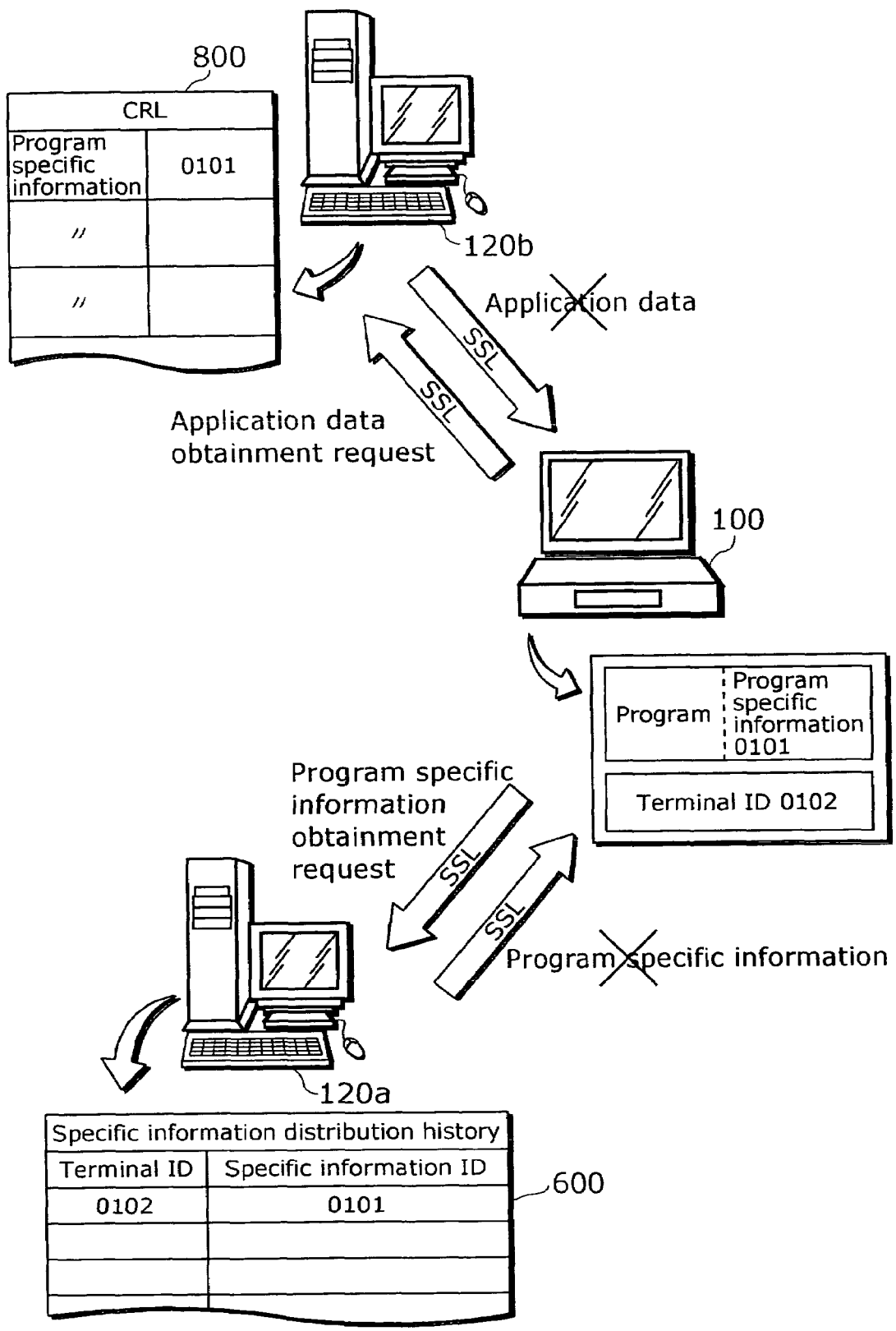
FIG. 8 is an overall diagram of the program management system using a server apparatus, in the first embodiment.

FIG. 8 is an overall diagram of the program management system using the server apparatus 120, in the present embodiment.

A program server apparatus 120*a* transmits a program corresponding to a program obtainment request to an information processing terminal 100. A server apparatus 120*b* transmits an application used by the program running on the information processing terminal 100, to the information processing terminal 100. It should be noted that in FIG. 8, explanation shall be carried out assuming that the information processing terminal 100 holds a program with the program specific information "0101", and that it is a terminal attempting to illicitly obtain new program specific information in order to avoid the revocation of a CRL 800. Furthermore, to facilitate safe program distribution, the communication channel is assumed to be a cipher communication channel using an SSL.

When the user of the information processing terminal 100 requests for application data, an application obtainment request with the program specific information "0101" of the program held by the information processing terminal 100 attached, is transmitted to the application data server apparatus 120*b*.

The server apparatus 120*b* possesses the revocation list (CRL) 800 of unauthorized programs, which makes use of program specific information, and revocation of an unauthorized information processing terminal is carried out through the non-transmission of the application data due to the description, in the CRL 800, of the program specific information "0101" attached to the obtainment request from the information processing terminal 100. Moreover, in the case where the program specific information is not described in the CRL 800, the server apparatus 120*b* transmits the application data to the information processing terminal 100. Furthermore, download data manipulation, replacement, eavesdropping, and so on, over the communication channel is prevented by the attachment of a CA signature to the data to be downloaded from the server apparatus 120*a*, or the like, and the performance of signature verification at the information processing terminal 100.

The user of the information processing terminal 100 having the program specific information "0101" described in the CRL 800 carries out an obtainment request for program specific information to the program server 120*a* in order to obtain a different, new program specific information and avoid the revocation according to the CRL.

In a case such as this, the server apparatus 120a in the present invention possesses, in the specific information distribution history holding unit 140, a specific information distribution history 600 having a terminal ID "0102" of the information processing terminal 100, and the program specific information ID "0101" recoded with regard to a previously distributed program.

Subsequently, in the case where a new program specific information request is carried out from the information processing terminal 100 to the server apparatus 120a, the server apparatus 120a judges whether or not the terminal ID "0102" attached to this program specific information request is described in the specific information distribution history 600. In the case where it is described, the distribution of program specific information is prohibited, and the distribution of only the program body to the information processing terminal 100 is carried out. Moreover, in the case where, referring to the specific information distribution history 600, the program specific information ID corresponding to the terminal ID attached to the program specific information request is not described, the terminal ID and the program specific information ID are associated with each other and added into the specific information distribution history 600, and the program and program specific information are distributed to the information processing terminal 100 as well.

Moreover, only program specific information is not distributed again to the information processing terminal 100 by the server apparatus 120a. The distribution the body of the program, two or more times, does not matter. This is because, as the program specific information is revoked according to the CRL 800, the user of the information processing terminal 100 attempting an unauthorized use is revoked for as long as the program specific information is not updated.

Figure 9:
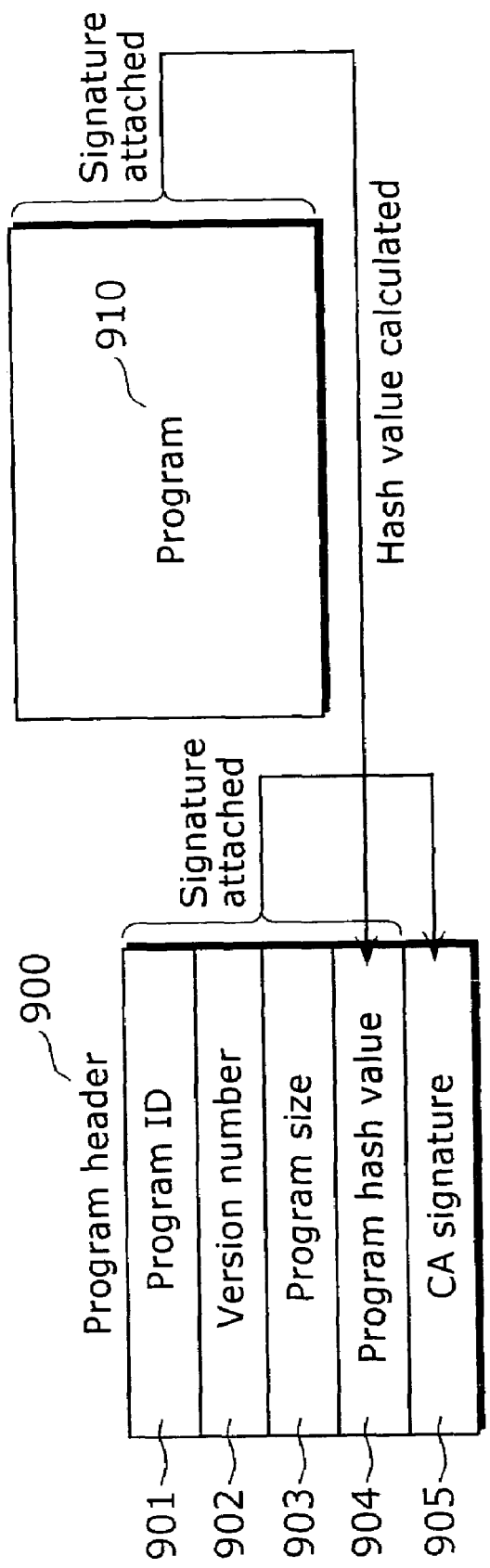
FIG. 9 is a diagram showing a different data structure included in a program header and a program, in the first embodiment.

FIG. 9 is a diagram showing a different data structure included in a program header 900 and a program 910, in the present embodiment. FIG. 9 is different from FIG. 3 in the point that the CA signature 311 is not attached to the program 910.

The program header 900 is used for storing information regarding the program 910, and includes a program ID (901), a version number (902), a program size (903), a program hash value (904), a CA signature (905), which are the same as the information included in the aforementioned program header 300.

In the case where validity verification of the program header 900 and the program 910 is carried out in the information processing terminal 100, first of all, the program header 900 is obtained from the server apparatus 120, and the CA signature 905 attached to the program header 900 is verified. With this, the information processing terminal 100 verifies that the program header 900 is unmanipulated information distributed from a valid distribution source.

Next, the hash value of the program 910 is calculated. The calculated hash value and the program hash value stored in the program header 900 are compared to confirm if these match. With this, it becomes possible for the information processing terminal 100 to verify that the program 910 is unmanipulated information distributed from a valid distribution source.

In this manner, by using the program hash value 904 stored in the program header 910 and attaching the CA signature 905 to only the program header 900 in the validity verification of the program 910, it becomes possible to verify validity in the same way as in the case where signatures are attached to the program header 900 and the program 910, while reducing the information requiring the CA signature in the program 910. Furthermore, in the case where the combination of the program header 900 and the program 910 are illicitly changed, the anomaly in the combination can be detected through the program hash value calculation in the information processing terminal 100. Moreover, as a result of not attaching a CA signature to the program 910, the need for the program 910 to be forwarded to the certification authority for CA signature attachment is eliminated.

Figure 10:
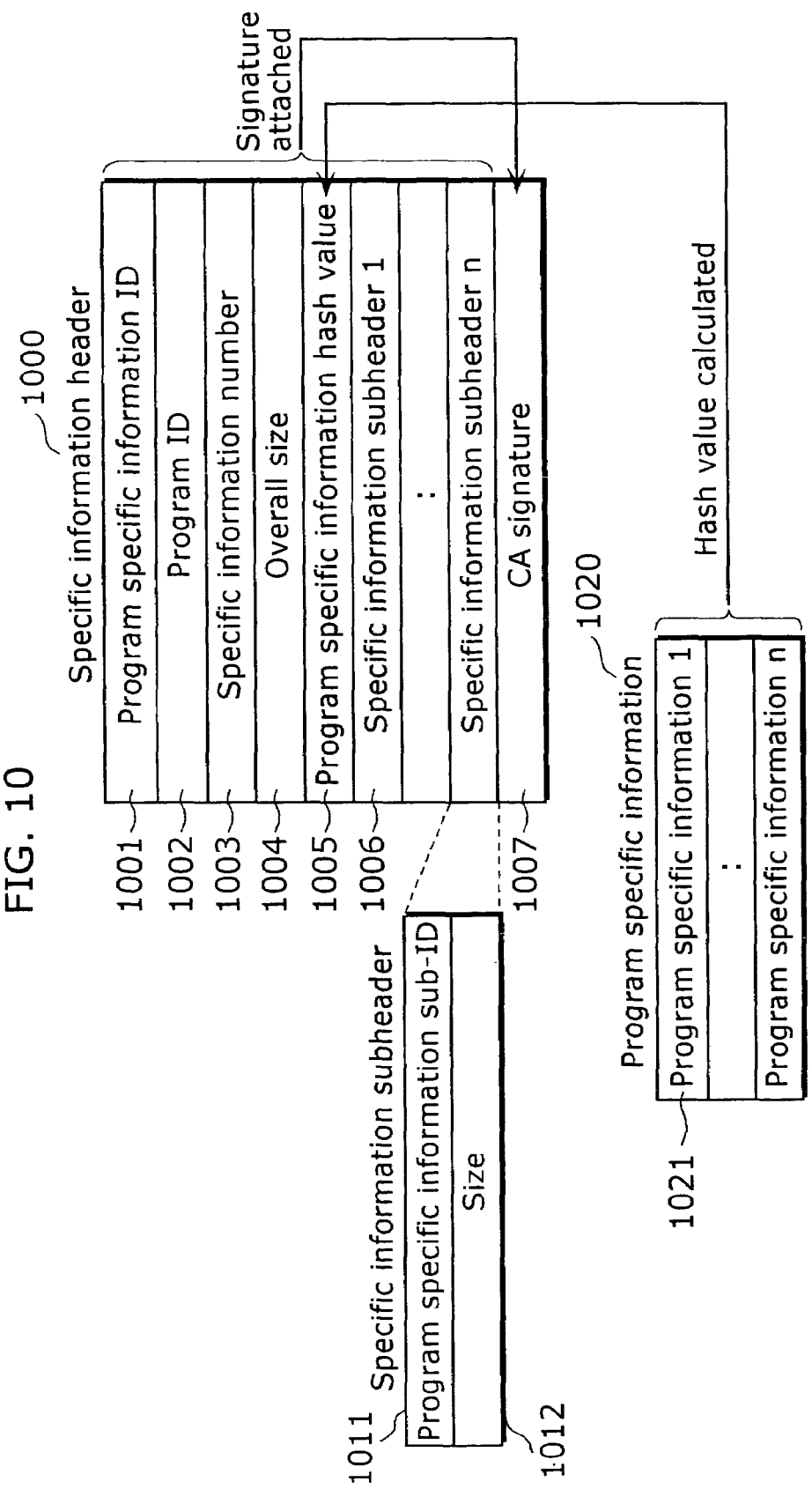
FIG. 10 is a diagram showing a different data structure included in the specific information header and the program specific information.

Next, FIG. 10 is a diagram showing a different data structure included in a specific information header 1000 and program specific information 1020. FIG. 10 is different from FIG. 4 in the points that the specific information header 1000 possesses a program specific information hash value 1005, and the CA signature 422 is not attached to the program specific information 1020.

The specific information header 1000 is used for storing information regarding the program specific information 1020, and is made up of a program specific information ID 1001, a program ID 1002, a specific information number 1003, an overall size 1004 of the program specific information, an overall, program specific information hash value 1005, a specific information subheader 1006, and a CA signature 1007 for the entirety of the specific information header. These are the same as the information included in the above-mentioned specific information header 400.

Accordingly, by calculating the hash value of the program specific information 1020, and comparing the calculated hash value with the program specific information hash value 1005 stored in the specific information header 1000 and confirming if these match, it is possible for the information processing terminal 100 to verify that the program specific information 1020 is unmanipulated information distributed from a valid distribution source.

As mentioned above, through the possession of the specific information distribution history holding unit 140 by the server apparatus 120 in the present embodiment, the server apparatus 120 can prevent the obtainment of new program specific information corresponding to a previously distributed program, by the information processing terminal 100. As such, secure downloading can be realized by avoiding unauthorized acts, such as hacking, by the information processing terminal 100 attempting to avoid revocation by obtaining new program specific information 420.

Furthermore, by encrypting the program obtained from the server apparatus 120 in the information processing terminal 100 using the terminal specific key 110 stored in a secure flash memory, or the like, which can only be accessed from the inside, the process of encrypting the program in the server apparatus through a key which is specific to the information processing terminal as in the conventional manner, becomes unnecessary, and the program encryption load of the server apparatus 120 can be reduced. It is should be noted that in this case, when encryption is done in the information processing terminal 100 using the terminal specific key 110, it is necessary to confirm that encryption is carried out properly. With regard to this point, in the present invention, it is possible to determine the success or failure of program storage without concern for the descrambling with the terminal specific key 110, which is different for each information processing terminal 100, through the descrambling after program storage using the terminal specific key 110, and verification according to the hash value of the plain text program, by the information processing terminal 100.

In addition, the entirety of a program is separated into the program 310 and the program specific information 420 and created individually by the server apparatus 120. Accordingly, through the management of a plurality of program specific information 420, which is comparatively small in size and different for each information processing terminal 100, and managing only one program 310 which is large in size but common for all the information processing terminals 100, the size of distribution information to be managed by the server apparatus 120 is greatly reduced, which, in turn, enables the reduction of the information processing load.

Furthermore, by storing the hash value of the program specific information 1020 in the specific information header 1000, and attaching the CA signature 1007 to only the specific information header 1000, in the server apparatus 120, the same results can be attained as in the case where the CA signature 1007 is attached to the specific information header 1000 and the program specific information 1020, while reducing the information requiring the CA signature in the program 910. In addition, in the case where the combination of the specific information header 1000 and the program specific information 1020 are illicitly changed, the anomaly in the combination can be verified through the calculation of the hash value of the program specific information 1020, in the information processing terminal 100.

It should be noted that the format of the specific information distribution history 600 held in the specific information distribution history holding unit 140 shown in the present embodiment is one example. It is possible to delete the last distribution date 603, and it is also possible to add other information. Furthermore, although the distribution of the program specific information 420 for the terminal ID 601 described in the specific information distribution history 600 is denied in the present embodiment, a program specific information 420 which has already been distributed can be distributed again to the information processing terminal 100 possessing such terminal ID 601, for as long as it is not an unauthorized obtainment.

Further, in the server apparatus 120 in the present embodiment, the request from the information processing terminal 100 can be either of a program distribution request which involves the distribution of a program, or a program specific information distribution request which does not involve the distribution of a program.

In addition, although the transmission and reception of encrypted data using an SSL is carried out between the information processing terminal 100 and server apparatus 120, other protocols can also be used aside from the SSL, as long as it is a method where the safe transmission and reception of data can be carried out between two points.

Moreover, although the data storage unit 106 and the program storage unit 105 are kept separate in the present embodiment, these can also be a single storage unit. Furthermore, although the terminal public key certificate 113 is stored in the confidential information storage unit 107, it can also be stored in the data storage unit 106.

Moreover, the program header 300 and specific information header 400 are created separately from the program 310 and the program specific information 420, in the server apparatus 120. However, it is also possible to have the program 310 and the program header 300, as well as the program specific information 420 and the specific information header 400, as single units of information where only the header portions are cut out and transmitted before the distribution from the server apparatus 120.

In addition, although an example is shown in the present embodiment where encryption with the session key is carried out on the program 310 and the program specific information 420 upon distribution, it is also possible to have a configuration in which further descrambling is carried out using a key that is different from the session key, with such key being transmitted by being included in the program header 300 and the specific information header 400.

Furthermore, the item described as the hash value in the present embodiment can use as an algorithm, existing hash algorithms such as SHA-1, MD-5, or an original algorithm. Furthermore, in place of the hash algorithm, detection of manipulation can also be carried out using methods such as checksum. Furthermore, distribution of program specific information is not required in the case where a program which does not require different information for each information processing terminal 100, is distributed.

Second Embodiment

Figure 11:
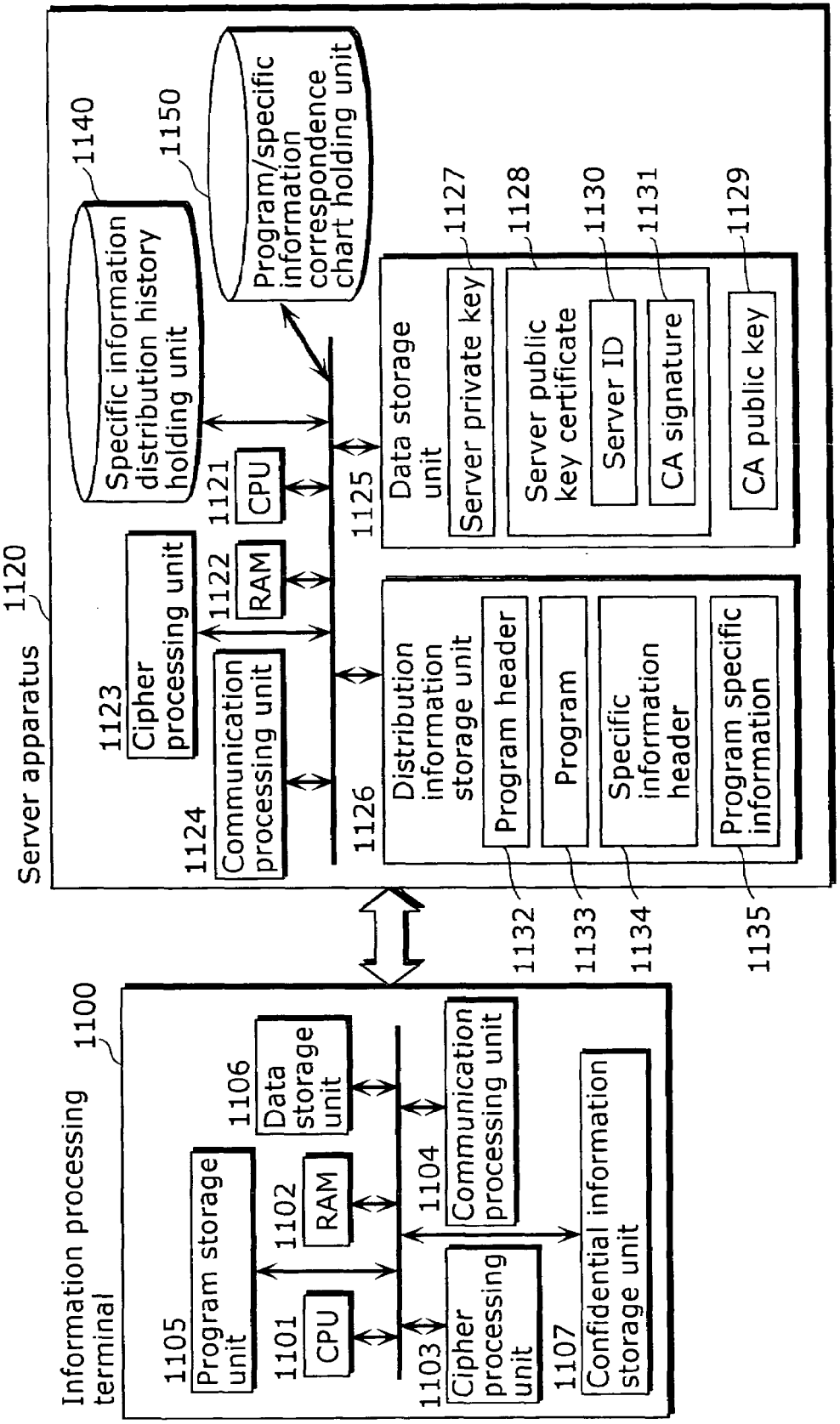
FIG. 11 shows the configuration diagram of the information processing terminal and the server apparatus, in the second embodiment of the second invention.

FIG. 11 shows the configuration diagram of an information processing terminal 1100 and a server apparatus 1120 in the second embodiment of the present invention. In the same diagram, the point of difference with the first embodiment is the point in which the server apparatus 1120 holds a program/specific information correspondence chart holding unit 1150.

This program/specific information correspondence chart holding unit 1150 is a storage unit for holding a program/specific information correspondence chart 1210 which indicates the correspondence of a program specific ID for uniquely identifying program specific information, and a program ID for uniquely specifying a program using program specific information.

FIG. 12A and FIG. 12B are diagrams showing examples of information included in the specific information distribution history 1200 as well as the program/specific information correspondence chart 1210, in the present embodiment.

A specific information distribution history holding unit 1140 manages a specific information distribution history 1200 which is different from the aforementioned specific information distribution history 600 in the first embodiment, in being provided with a program ID 1202 for identifying a program corresponding to distributed program specific information. Moreover, as a terminal ID 1201, a program ID 1203, and a last distribution date 1204, stored in the specific information distribution history 1200 are the same as those in FIG. 6, detailed information shall be omitted.

In the example of the specific information distribution history 1200, the server apparatus 1120 has already distributed five program specific information ID 1203 to the information processing terminal 1100, and their respective terminal ID 1201, program ID 1202, and program specific information ID 1203 sets are, (terminal ID, program ID, program specific information ID)=(0001, 0001, 0001), (0002, 0001, 0002), (0010, 0001, 0003), (0015, 0001, 0004), and (0020, 0002, 1001).

In addition, the program/specific information correspondence chart holding unit 1150 stores, in the program/specific information correspondence chart 1210, the correspondence relation of a program ID 1211 of the programs managed by the server apparatus 1120, and program specific information 1212 for identifying program specific information used by each program.

In the example in FIG. 12A and FIG. 12B, the server apparatus 1120 manages a program with a program ID of 0001, and manages program specific information having IDs from 0001 to 1000 as the program specific information used by such program. Likewise, it manages a program having a program ID of 0002 and the program specific information with IDs from 1001 to 2000, used by such program. Furthermore, a distribution start ID 1213, which is the program specific information to be distributed upon the start of the next program specific information distribution, is stored in the program/specific information correspondence chart 1210 in order to prevent the re-distribution of distributed program specific information to the information processing terminal 1100.

The example in FIG. 12B, shows the allocation of the program specific information with program specific ID 0123 by the server apparatus 1120 in the case where new program specific information is allocated to the program having the program ID 0001. Likewise, the allocation of the program specific information with program specific ID 1423 by the server apparatus 1120 is also shown in the case where new program specific information is allocated to the program having the program ID 0002.

Furthermore, in response to a program distribution request which designates a program ID from the information processing terminal 1100, the server apparatus 1120 uses the program/specific information correspondence chart 1210 and distributes the program specific information corresponding to such program ID.

Figure 13:
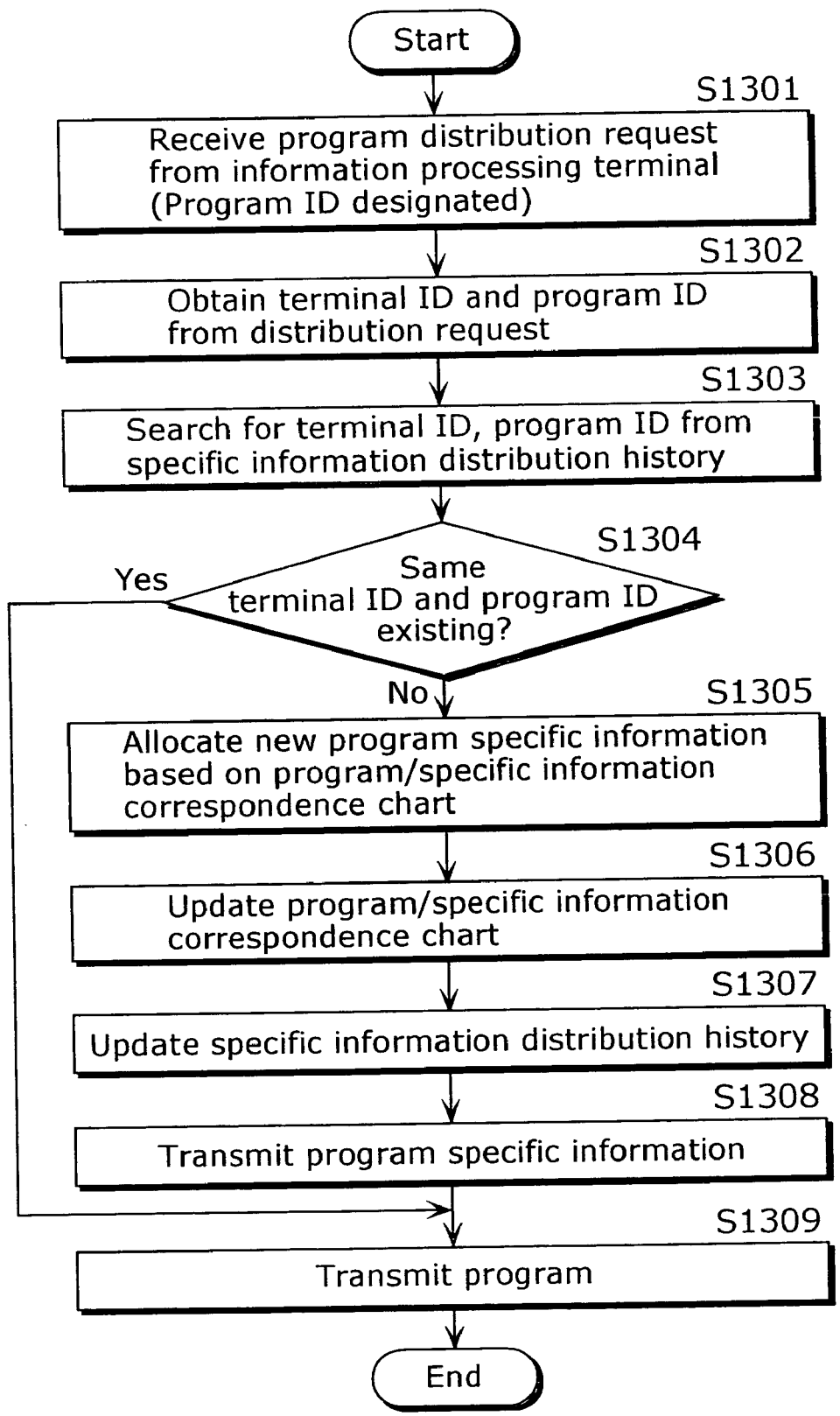
FIG. 13 is a flowchart showing the program distribution procedure in the server apparatus.

The program distribution procedure in the second embodiment of the present invention shall be explained using FIG. 13. FIG. 13 is a flowchart showing the program distribution procedure in the server apparatus 1120.

First, the server apparatus 1120 receives a program distribution request from the information processing terminal 1100 (S1301). This program distribution request designates a program ID.

Next, the server apparatus 1120 obtains the terminal ID of the information processing terminal 1100 and the program ID from the program distribution request received (S1302). Then, the obtained terminal ID and program ID are searched for in the specific information distribution history 1200 (S1303), and confirmation is made as to whether or not a record of the same terminal ID and program ID are stored in the specific information distribution history 1200 (S1304).

In the case where a record of the same terminal ID and program ID are stored in the specific information distribution history 1200 (Yes, in S1304), the server apparatus 1120 transmits only the program 1133 and concludes the process (S1309) as the program specific information 1135 for the designated program has already been distributed to the information processing terminal 1100.

In the case where a record of the same terminal ID and program ID are not stored in the specific information distribution history 1200 (No, in S1304), the server apparatus 1120 allocates a new program specific information 1135 to the information processing terminal 1100, based on the distribution start ID stored in the program/specific information correspondence chart 1210 (1305).

Next, the server apparatus 1120 refers to the program/specific information correspondence chart 1210 stored in the program/specific information correspondence chart holding unit 1150, and updates the value of the distribution start ID 1213 (S1306), with regard to the newly allocated program specific information 1135. Furthermore, the correspondence of the terminal ID and the program specific information ID, with regard to the newly allocated program specific information 1135, is added to the specific information distribution history 1200 (S1307). Subsequently, the server apparatus 1120 transmits the program specific information 1135 to the information processing terminal 1100 (S1308), then transmits the program 1133 (S1309), and concludes the process.

As mentioned above, as a result of possessing the specific information distribution history holding unit 1140 and the program/specific information correspondence chart holding unit 1150, and by carrying out the distribution management of program specific information using the specific information distribution history 1200 and the program/specific information correspondence chart 1210, the server apparatus 1120 in the present embodiment can prevent the distribution of a plurality of program specific information 1135 to the same program running on one information processing terminal 1100. Consequently, it becomes possible to prevent the obtainment of new program specific information 1135 by the information processing terminal 1100 attempting to avoid revocation by obtaining new program specific information 1135.

Furthermore, by managing the distribution of program specific information 1135 on a per program basis by storing the correspondence of the program to be downloaded and the information processing terminal 1100 on which such program runs, in the program/specific information correspondence chart 1210, the server apparatus 1120 in the present embodiment can determine for each program, whether or not to distribute program specific information 1135. As such, the server apparatus 1120 can refer to the program/specific information correspondence chart 1210 and prevent the distribution of a program to an information processing terminal 1100, on which the program is not subject to run.

Moreover, although the data storage unit 1106 and the program storage unit 1105 are different in the present embodiment, these can also be a single storage unit. Furthermore, the format of the specific information distribution history 1200 indicated in the present embodiment is one example. It is possible to delete the last distribution date 1204, and it is also possible to add other information. Likewise, the format of the program/specific information correspondence chart 1210 is also one example, and the distribution start ID 1213 can be managed using a different format. For example, the distribution status of program specific information 1135 can be managed by having a table storing all the program specific information IDs, and setting up a flag for each program, which identifies whether or not it has already been allocated.

Furthermore, although the distribution of the program specific information 1135 for the terminal ID 1201 described in the specific information distribution history 1200 is denied in the present embodiment, a program specific information 1135 which has already been distributed can be distributed again to such information processing terminal 1100. Furthermore, in the present embodiment, the request from the information processing terminal 1100 can be a program distribution request which involves the distribution of a program or a program specific information distribution request which does not involve the distribution of a program.

Third Embodiment

Figure 14:
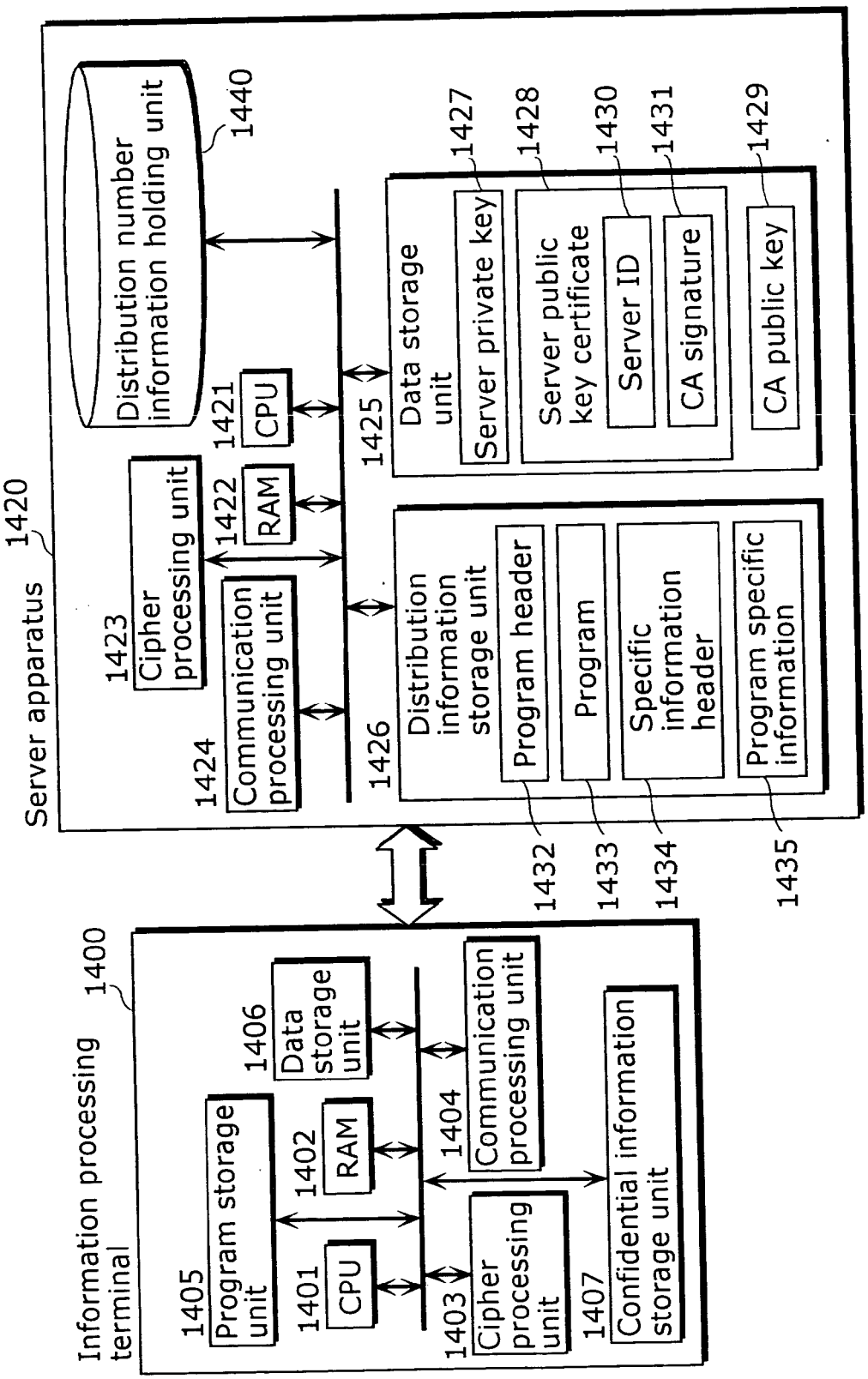
FIG. 14 is a configuration diagram of the information processing terminal and the server apparatus, in the third embodiment.

FIG. 14 shows the configuration diagram of an information processing terminal 1400 and a server apparatus 1420 in the present embodiment. In the same diagram, the point of difference with the aforementioned first and second embodiments is the point in which the server apparatus 1420 possesses a distribution number information holding unit 1440.

This distribution number information holding unit 1440 is a hard disk holding distribution number information 1500 for managing the number of times program specific information 1435 is distributed from the server 1420 to the same information processing is terminal 1400.

FIG. 15 is a chart showing an example of the information storage of the distribution number information 1500 in the present embodiment.

A terminal ID 1501 for identifying an information processing terminal 1400 to which program specific information 1435 has been distributed, and a counter 1502 for indicating the number of times of the distribution, are stored in the distribution number information 1500. In the example in the same chart, it is indicated that program specific information 1435 have been distributed once to the information processing terminals 1400 with the terminal IDs 0001 and 0002, and that program specific information 1435 has not been distributed to the information processing terminal 1400 with the terminal ID 0003.

Figure 16:
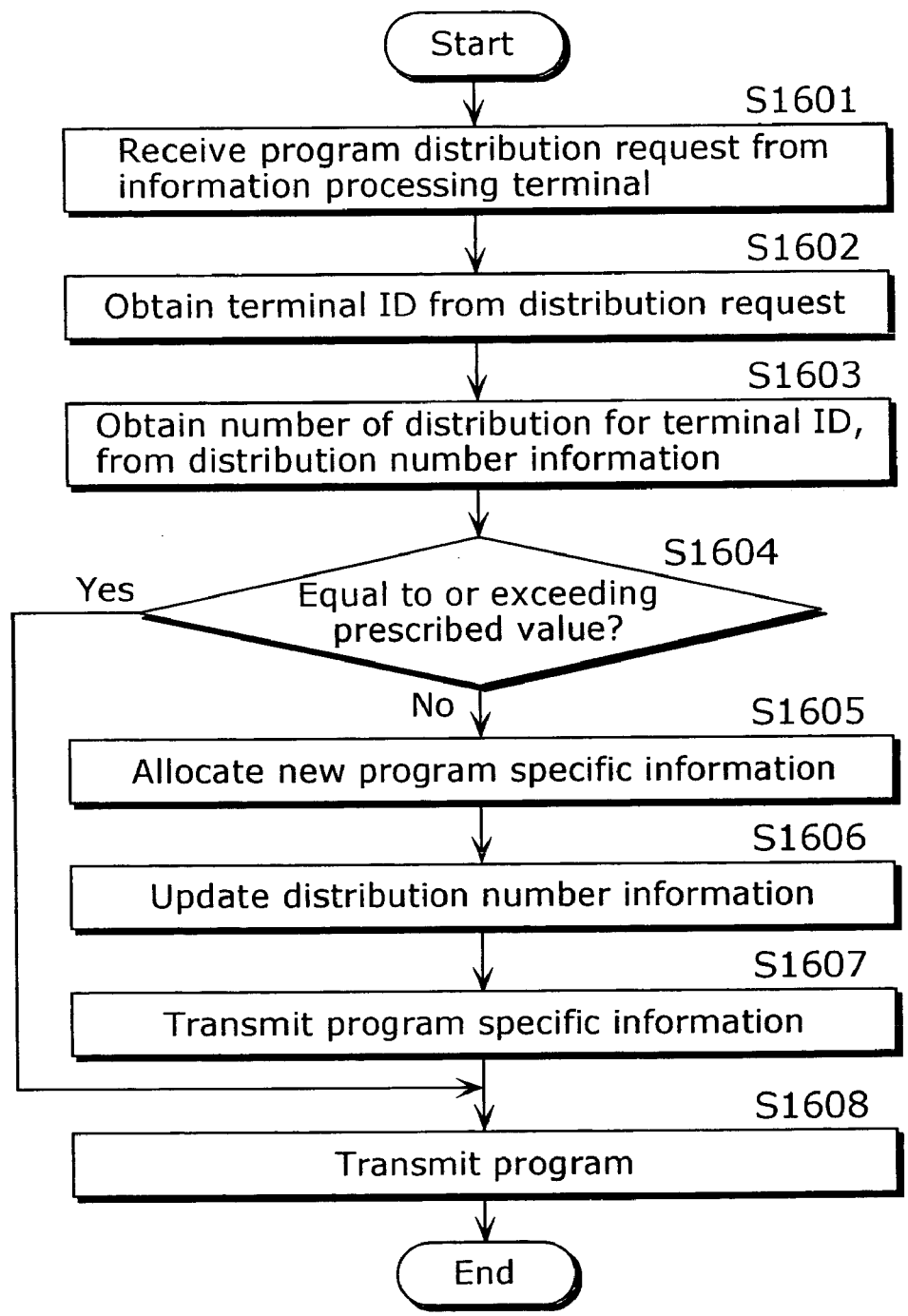
FIG. 16 is a flowchart showing the program distribution procedure in the server apparatus.
Figure 20:
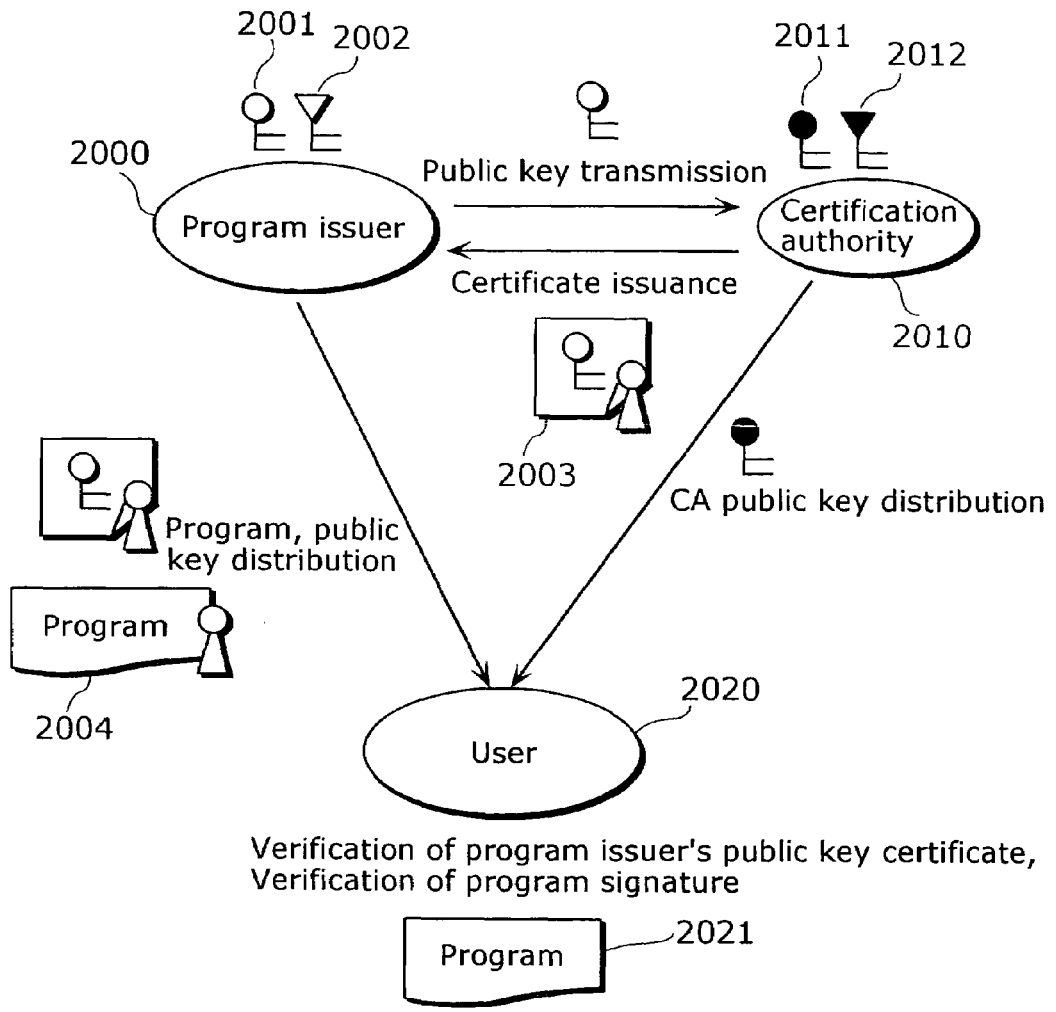
FIG. 20 is an explanatory diagram for a program validity verification method using the conventional digital signature.
Figure 21:
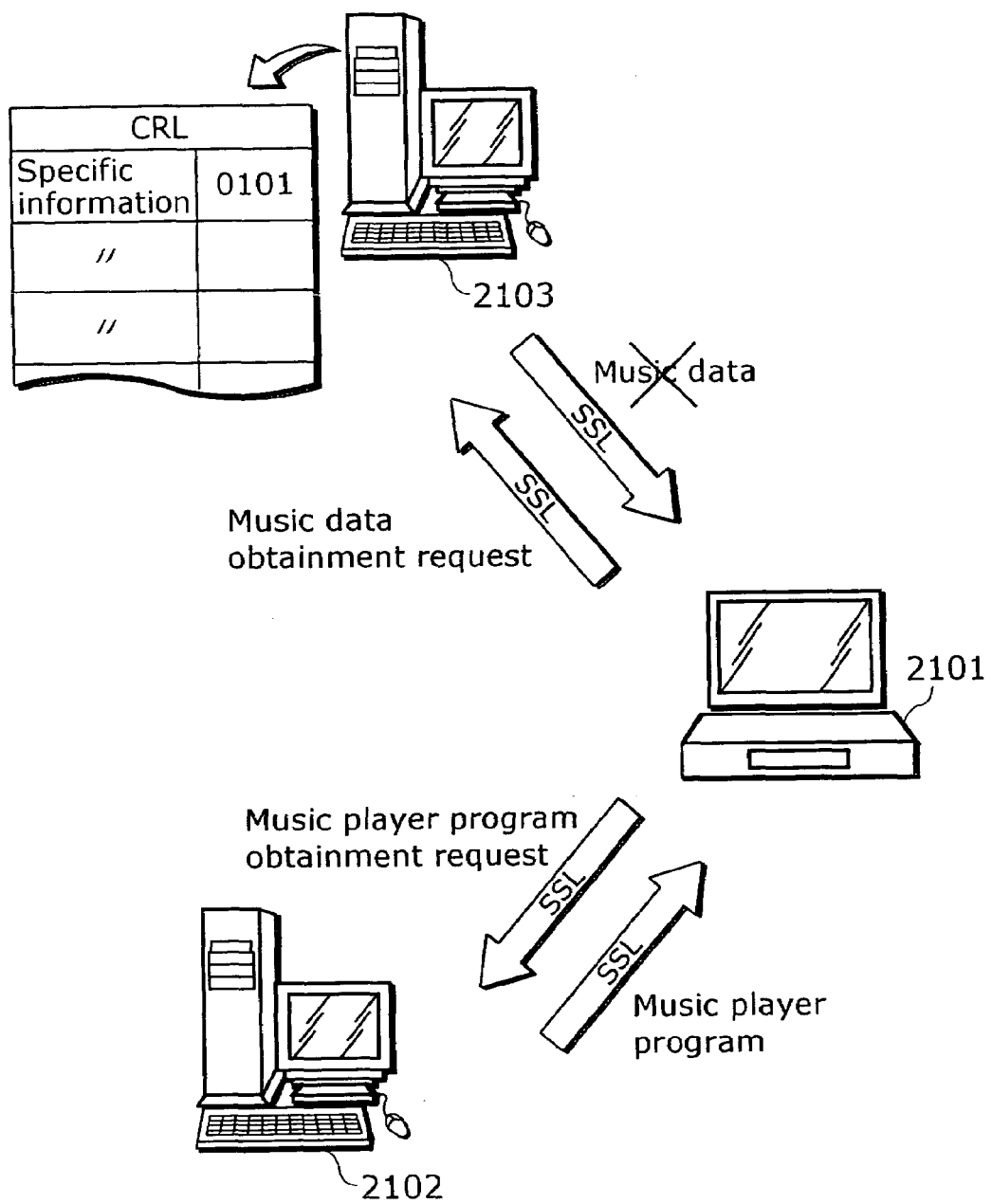
FIG. 21 is a reference diagram of the conventional program management system used between an information processing terminal and server apparatuses.

FIG. 16 is a flowchart showing the program distribution procedure in the server apparatus 1420.

First, the server apparatus 1420 receives a program distribution request from the information processing terminal 1400 (S1601). Next, the server apparatus 1420 obtains the terminal ID of the information processing terminal 1400, included in the program distribution request received in S1601 (S1602).

Subsequently, the server apparatus 1402 searches for the terminal ID obtained in S1602 using the distribution number information 1500 stored in the distribution number information holding unit 1440, and obtains the value of the counter (S1603). Furthermore, it determines whether or not the obtained counter value is greater than or equal to a prescribed value (S1604).

Subsequently, in the case where the obtained counter value is greater than or equal to the prescribed value (Yes, in S1604), the server apparatus 1420 transmits only a program 1433 (S1608) and concludes the process, as program specific information 1435 has already been distributed to the information processing terminal 1400, a number of times equaling or exceeding the prescribed number of times.

On the other hand, in the case where the obtained counter value is less than the prescribed value (No, in S1604), the server apparatus 1420 allocates program specific information 1435 anew to the information processing terminal 1400 (S1605). Furthermore, the server apparatus 1420 increases the value of the counter of the distribution number information 1500 stored within the distribution number information holding unit 1440 (S1606). Subsequently, the server apparatus 1420 transmits the program specific information 1435 to the information processing terminal 1400 (S1607), then transmits the program 1433 (S1608), and concludes the process.

In this manner, as a result of possessing the distribution number information holding unit 1440 and by carrying out the distribution management of program specific information 1435 using distribution number information 1500, the server apparatus 1420 in the present embodiment can prevent the distribution of program specific information 1435 to a single information processing terminal 1400, a number of times equaling or exceeding the prescribed value. In particular, in the case where the prescribed value is set at 1, the server apparatus 1420 can prevent the allocation of new program specific information 1435 for the avoidance of revocation by an information processing terminal 1400 that has been recognized and revoked as an unauthorized terminal through the use of information included in program specific information 1435, as in the first and the second embodiments in the present invention.

Furthermore, by assuming that the prescribed value indicating the number of distributions for program specific information 1435 is 2 or more, re-distribution or new distribution of program specific information 1435 can be duly carried out for a user purchasing a program again, not for unauthorized purposes, but for reasons such as a hard disk breakdown.

Moreover, although a data storage unit 1406 and a program storage unit 1405 are different in the present embodiment, these can also be a single storage unit. Furthermore, the format of the distribution number information 1500 indicated in the present embodiment is one example, and it is also possible to add other information. Furthermore, in the present embodiment, the request from the information processing terminal 1400 can be a program distribution request which involves the distribution of a program or a program specific information distribution request which does not involve the distribution of a program.

Fourth Embodiment

FIG. 17 shows the configuration diagram of an information processing terminal 1700 and a server apparatus 1720, in the present embodiment. In the same diagram, the point of difference with the third embodiment is the point in which the server apparatus 1720 holds a program/specific information correspondence chart holding unit 1750. This program/specific information correspondence chart holding unit 1750 is the same storage unit as the program/specific information correspondence chart holding unit 1150 explained in FIG. 11.

FIG. 18A and FIG. 18B are diagrams showing an example of data stored in distribution number information 1800 and a program/specific information correspondence chart 1810, in the present embodiment.

The distribution number information 1800 stores a counter 1803 indicating a program ID 1801 of a distributed program, a terminal ID 1802 of the information processing terminal 1700 to which program specific information 1735 has been distributed, and the number of times program specific information is distributed. The point of difference with the distribution number information is 1500 in the aforementioned third embodiment is the point in which a program ID 1801 for identifying the program using the program specific information is added.

The distribution number information 1800 indicates that program specific information 1735 used by a program with program ID 0001 is distributed once to the information processing terminals 1700 with the terminal IDs 0001, and 0002, and that program specific information 1735 has not been distributed to the information processing terminals 1700 with the terminal ID 0003. Furthermore, it likewise indicates that program specific information 1735 used by a program with program ID 0002 is distributed once to the information processing terminal 1700 with the terminal ID 0001, and that such program specific information 1735 has not been distributed to the information processing terminals 1700 with the terminal IDs 0002, and 0003.

Moreover, the program/specific information correspondence chart 1810 is the same as the program/specific information correspondence chart 1210 in FIG. 12 mentioned earlier so detailed explanation shall be omitted.

FIG. 19 is a flowchart showing the program distribution procedure in the server apparatus 1720.

First, the server apparatus 1720 receives a program distribution request from the information processing terminal 1700 (S1901). The program distribution request includes the program ID of the program for which obtainment is being requested by the information processing terminal 1700. Next, the server apparatus 1720 obtains the terminal ID of the information processing terminal 1700 and the program ID included in the program distribution request obtained in S1901 (S1902).

Subsequently, the server apparatus 1720 searches the distribution number information 1800 for the terminal ID and program ID obtained in S1902, and obtains the value of the counter (S1903). Next, it determines whether or not the obtained counter value is greater than or equal to a prescribed value (S1904).

Furthermore, in the case where the obtained counter value is greater than or equal to the prescribed value (Yes, in S1904), the server apparatus 1720 transmits only a program 1733 (S1909) and concludes the process, as program specific information 1735 has already been distributed to the information processing terminal 1400 a number of times equaling or exceeding the prescribed number of times.

Next, in the case where the obtained counter value is less than the prescribed value (No, in S1904), the server apparatus 1420 allocates new program specific information 1735 to the information processing terminal 1700, based on information of the distribution start ID stored in the program/specific information correspondence chart 1801 (S1905).

Subsequently, the server apparatus 1720 updates the value of the distribution start ID stored in the program/specific information correspondence chart 1810, with regard to the program specific information 1735 newly allocated in S1905 (S1906). Furthermore, it increases the value of the counter stored within the distribution number information 1800 (S1907), and transmits the program specific information 1735 to the information processing terminal 1700 (S1908). It then transmits the program 1733 (S1909), and concludes the process.

As mentioned above, as a result of possessing the distribution number information holding unit 1740 and the program/specific information correspondence chart holding unit 1750, and by managing the distribution of program specific information 1735 using the distribution number information 1800 and the program/specific information correspondence chart 1810 held in the respective storage units, the server apparatus 1720 in the present embodiment can prevent the distribution of program specific information 1735 to the same program running on a single information processing terminal 1700, a number of times equaling or exceeding a prescribed value, and an information processing terminal 1700 attempting the unauthorized use of program specific information 1735 can be revoked.

Furthermore, in the present embodiment, the server apparatus 1720 can determine whether or not program specific information 1735 can be distributed for each program, by managing the distribution of program specific information on a per program basis.

Moreover, although a data storage unit 1706 and a program storage unit 1705 are different in the present embodiment, these can also be a single storage unit. Furthermore, the format of the specific distribution number information 1800 indicated in the present embodiment is one example, and it is also possible to add other information. Likewise, the format of the program/specific information correspondence chart 1810 is one example, and management can be done using a different format. Furthermore, in the present embodiment, the request from the information processing terminal 1700 can be a program distribution request which involves the distribution of a program or a program specific information distribution request which does not involve the distribution of a program.

As mentioned above, by possessing the specific information distribution history holding unit, the server apparatus in the present embodiment can prevent an information processing terminal from obtaining new program specific information corresponding to a previously distributed program, and unauthorized acts of an information processing terminal attempting to avoid revocation by obtaining new program specific information can be reliably prevented.

Furthermore, through the encryption of programs obtained is from the server apparatus by the information processing terminal in the present invention, using a terminal specific key, the burden of program encryption on the server apparatus can be reduced. In addition, as the entirety of a program is separated into a program and program specific information which are created individually by the server apparatus in the present invention, the size of distribution information managed in the server apparatus can be reduced and the burden of information processing can be lightened through the management of a plurality of program specific information and the management of only one program, by the server apparatus. The program specific information has comparatively small size but is different for each information processing terminal, whereas the single program has a large size but is common for all the information processing terminals.

In addition, as a body of the program running on the information processing terminal, a program header, program specific information, and a specific information header are included in the entirety of a program distributed from the server apparatus in the present invention to an information processing terminal, the validity of information distributed from the server apparatus to the information processing terminal can be confirmed through the use of CA signatures and hash values on the respective information making up the program.

The server apparatus, as well as the program management system, in the present invention is useful as a server apparatus for distributing a program, via the network, to a personal computer equipped with a communication function and an information processing terminal such as a mobile phone, and is also useful as a program management system between such server apparatus and information processing terminal.

The invention claimed is:

1. A server apparatus, connected to an information processing terminal via a network, for determining whether or not to distribute a program in response to and identified in a program obtainment request attached to a terminal ID transmitted from the information processing terminal, wherein the information processing terminal stores the terminal ID such that the stored terminal ID cannot be re-written externally, wherein the identified program includes a program body for running on the information processing terminal and program specific information for running the program body, and wherein the server apparatus comprises:

a receiving unit operable to receive the program obtainment request attached to the terminal ID, the program obtainment request being received from the information processing terminal;

a table holding unit operable to hold a first table identifying a relationship between a previously distributed program and a terminal ID; and a decision unit operable to (i) decide whether or not the terminal ID attached to the program obtainment request received by the receiving unit is recorded in the first table, (ii) distribute only the program body of the identified program to the information processing terminal by prohibiting distribution of the program specific information of the identified program in a case where the decision unit decides that the terminal ID is recorded in the first table, and (iii) in a case where the decision unit decides that the terminal ID is not recorded in the first table, add, to the first table, the terminal ID and the program specific information, such that the added terminal ID and the program specific information have a corresponding relationship identified in the first table and distribute the program body and the program specific information, as the identified program, to the information processing terminal, wherein the distributed program specific information is for revoking the information processing terminal from attempting an unauthorized use of the identified program.

2. The server apparatus according to claim 1, wherein, in response to each program obtainment request from the information processing terminal, the decision unit distributes the program body of a program identified in each program obtainment request, and distributes the program specific information of each identified program only once.

3. The server apparatus according to claim 1,
wherein the table holding unit holds a second table identifying the terminal ID and a corresponding number of distributions of the program specific information, and
wherein the decision unit, by referring to the second table (i) distributes only the program body of the identified program to the information processing terminal by prohibiting distribution of the program specific information of the identified program in a case where the number of distributions corresponding to the terminal ID reaches a prescribed value, and (ii) updates the number of distributions corresponding to the terminal ID, as described in the second table and distributes the program body and the program specific information, as the identified program, to the information processing terminal, in a case where the number of distributions corresponding to the terminal ID does not reach the prescribed value.

4. The server apparatus according to claim 3,
wherein the table holding unit holds a third table identifying a relationship between the terminal ID attached to the program obtainment request from the information processing terminal, a program body ID for uniquely identifying the program body distributed to the information processing terminal having the terminal ID, and a number of distributions indicating a number of times the program specific information has been distributed to the information processing terminal having the terminal ID, and
wherein the decision unit, by referring to the third table, (i) distributes only the program body of the identified program to the information processing terminal by prohibiting distribution of the program specific information of the identified program in a case where the number of distributions, corresponding to both the program ID and the terminal ID attached to the program obtainment request transmitted from the information processing terminal, reaches the prescribed value, and (ii) updating the number of distributions corresponding to the terminal ID and the program ID, described in the third table and distributing the program body and the program specific information, as the identified program, to the information processing terminal, in a case where the number of distributions, corresponding to the program ID and the terminal ID attached to the program obtainment request transmitted from the information processing terminal, does not reach the prescribed value.

5. The server apparatus according to claim 4, wherein the prescribed value is a value indicating the number of distributions that the program specific information is allowed to be distributed from the server apparatus to the information processing terminal.

6. The server apparatus according to claim 3, wherein the prescribed value is a value indicating the number of distributions that the program specific information is allowed to be distributed from the server apparatus to the information processing terminal.

7. The server apparatus according to claim 1,
wherein the table holding unit holds a fourth table identifying a relationship between the terminal ID attached to the program obtainment request from the information processing terminal, a program body ID for uniquely identifying the program body distributed to the information processing terminal having the terminal ID, and a program specific information ID for uniquely identifying the program specific information distributed to the information processing terminal having the terminal ID, and
wherein the decision unit, by referring to the fourth table (i) distributes only the program body of the identified program to the information processing terminal by prohibiting distribution of the program specific information of the identified program in a case where the program specific information ID, corresponding to both the program ID and the terminal ID attached to the program obtainment request transmitted from the information processing terminal, is described in the fourth table, and in a case where the program specific information ID corresponding to both the program ID and the terminal ID attached to the program obtainment request is not described in the fourth table, adding, to the fourth table, the terminal ID, the program specific information ID, and the program ID, such that the terminal ID, the program specific information ID and the program ID have a corresponding relationship identified in the fourth table and distribute the program body and the program specific information, as the identified program, to the information processing terminal.

8. The server apparatus according to claim 1, wherein the server apparatus holds a plurality of program specific information which is information that is different for each information processing terminal, and holds one program body which is common for each information processing terminal.

9. The server apparatus according to claim 1,
wherein the table holding unit holds a fifth table identifying a relationship between a program body ID uniquely identifying the program body of the identified program and the terminal ID of the information processing terminal on which the program body runs, and
wherein the decision unit, by referring to the fifth table (i) determines that the program body of the identified program can be distributed in a case where the program ID and the terminal ID attached to the program obtainment request transmitted from the information processing terminal are identified in the fifth table as having a correspondence and (ii) determines that the program body of the identified program cannot be distributed in a case where the program ID and the terminal ID attached to the program obtainment request transmitted from the information processing terminal are not identified in the fifth table as having a correspondence.

10. A program distribution method of using a server apparatus, connected to an information processing terminal via a network, for determining whether or not to distribute a program in response to and identified in a program obtainment request attached to a terminal ID transmitted from the information processing terminal,
wherein the server apparatus holds a table identifying a relationship between a previously distributed program and a terminal ID,
wherein the information processing terminal stores the terminal ID such that the stored terminal ID cannot be re-written externally, wherein the identified program includes a program body for running on the information processing terminal and program specific information for running the program body, and wherein the method comprises:

receiving, from the information processing terminal, the program obtainment request attached to the terminal ID;

deciding whether or not the terminal ID attached to the received program obtainment request is recorded in the table;

distributing only the program body of the identified program to the information processing terminal by prohibiting distribution of the program specific information of the identified program in a case where the deciding decides that the terminal ID is recorded in the table; and in a case where the deciding decides that the terminal ID is not recorded in the table, adding, to the table, the terminal ID and the program specific information, such that the added terminal ID and the program specific information have a corresponding relationship identified in the table and distributing the program body and the program specific information, as the identified program, to the information processing terminal, wherein the distributed program specific information is for revoking the information processing terminal from attempting an unauthorized use of the identified program.

11. A computer-readable storage medium having a server program stored thereon, the server program being used by a server apparatus, connected to an information processing terminal via a network, for determining whether or not to distribute a program in response to and identified in a program obtainment request attached to a terminal ID transmitted from the information processing terminal, wherein the information processing terminal stores a terminal ID such that the stored terminal ID cannot be re-written externally, wherein the server apparatus holds a table identifying a relationship between a previously distributed program and a terminal ID, wherein the identified program includes a program body for running on the information processing terminal and program specific information for running the program body, and wherein the server program causes the server apparatus to execute a method comprising:

receiving, from the information processing terminal, the program obtainment request attached to the terminal ID;

deciding whether or not the terminal ID attached to the received program obtainment request is recorded in the table;

distributing only the program body of the identified program to the information processing terminal by prohibiting distribution of the program specific information of the identified program in a case where the deciding decides that the terminal ID is recorded in the table; and in a case where the deciding decides the terminal ID is not recorded in the table, adding, to the table, the terminal ID and the program specific information, such that the added terminal ID and the program specific information have a corresponding relationship identified in the table and distributing the program body and the program specific information, as the identified program, to the information processing terminal, wherein the distributed program specific information is for revoking the information processing terminal from attempting an unauthorized use of the identified program.

* * * * *